United States Patent
Dupont et al.

(10) Patent No.: US 10,859,725 B2
(45) Date of Patent: Dec. 8, 2020

(54) RESOURCE PRODUCTION FORECASTING

(71) Applicant: Sensia LLC, Houston, TX (US)

(72) Inventors: Emilien Dupont, Los Altos, CA (US); Velizar Vesselinov, Los Altos Hills, CA (US); Erik Burton, Menlo Park, CA (US); Jose Ramon Celaya Galvan, Menlo Park, CA (US); Andrey Konchenko, Menlo Park, CA (US)

(73) Assignee: Sensia LLC, Houston, TX (US)

( * ) Notice: Subject to any disclaimer, the term of this patent is extended or adjusted under 35 U.S.C. 154(b) by 429 days.

(21) Appl. No.: 15/701,327

(22) Filed: Sep. 11, 2017

(65) Prior Publication Data
US 2018/0335538 A1    Nov. 22, 2018

Related U.S. Application Data

(60) Provisional application No. 62/509,470, filed on May 22, 2017.

(51) Int. Cl.
| | | |
|---|---|---|
| G01V 1/50 | (2006.01) | |
| E21B 49/00 | (2006.01) | |
| G06F 17/18 | (2006.01) | |
| G06Q 50/02 | (2012.01) | |
| G06Q 10/04 | (2012.01) | |
| G01V 1/52 | (2006.01) | |
| G06N 7/00 | (2006.01) | |
| G06N 20/00 | (2019.01) | |

(52) U.S. Cl.
CPC .............. *G01V 1/50* (2013.01); *E21B 49/006* (2013.01); *G06F 17/18* (2013.01); *G06Q 10/04* (2013.01); *G06Q 50/02* (2013.01); *E21B 2200/22* (2020.05); *G01V 1/523* (2013.01); *G06N 7/005* (2013.01); *G06N 20/00* (2019.01)

(58) Field of Classification Search
CPC ........ G01V 1/50; G01V 1/523; E21B 49/006; E21B 2041/0028; G06F 17/18; G06Q 10/04; G06Q 50/02; G06N 20/00; G06N 7/005

See application file for complete search history.

(56) References Cited

U.S. PATENT DOCUMENTS

| | | | |
|---|---|---|---|
| 9,262,713 B2 * | 2/2016 | Shelley | E21B 43/26 |
| 2010/0138368 A1 | 6/2010 | Stundner et al. | |
| 2013/0124169 A1 * | 5/2013 | Sung | G01V 11/00 703/2 |

(Continued)

FOREIGN PATENT DOCUMENTS

WO    2015/152880 A1    10/2015

OTHER PUBLICATIONS

Communication pursuant to Article 94(3) for the equivalent European patent application 18173598.6 dated Jul. 5, 2019.

(Continued)

*Primary Examiner* — Manuel L Barbee
(74) *Attorney, Agent, or Firm* — Foley & Lardner LLP

(57) ABSTRACT

A method includes receiving data where the data include data for a plurality of factors associated with a plurality of wells; training a regression model based at least in part on the data and the plurality of factors; outputting a trained regression model; and predicting production of a well via the trained regression model.

19 Claims, 17 Drawing Sheets

(56) References Cited

U.S. PATENT DOCUMENTS

| | | | |
|---|---|---|---|
| 2013/0346040 A1* | 12/2013 | Morales German | ........................ G01V 99/005 703/2 |
| 2015/0039544 A1* | 2/2015 | Gupta | ...................... G01V 1/50 706/21 |
| 2018/0202264 A1* | 7/2018 | Sarduy | .................... E21B 49/08 |
| 2018/0293336 A1* | 10/2018 | Tao | ......................... E21B 43/26 |

OTHER PUBLICATIONS

Wei, et al., "A Symbolic Tree Model for Oil and Gas Production Prediction Using Time-Series Production Data," 2016 IEEE International Conference on Data Science and Advanced Analytics, Oct. 17, 2016, pp. 272-281.

Extended Search Report for the equivalent European patent application 18173598.6 dated Oct. 15, 2018.

Friedman, "Greedy Function Approximation: A Gradient Boosting Machine," The Annals of Statistics vol. 29, No. 5, 2001.

\* cited by examiner

RESOURCE PRODUCTION FORECASTING

RELATED APPLICATION

This application claims the benefit of U.S. Provisional Patent Application having Ser. No. 62/509,470, filed 22 May 2017, which is incorporated by reference herein.

BACKGROUND

Resources may exist in subterranean fields that span large geographic areas. As an example, hydrocarbons may exist in a basin that may be a depression in the crust of the Earth, for example, caused by plate tectonic activity and subsidence, in which sediments accumulate (e.g., to form a sedimentary basin). Hydrocarbon source rock may exist in a basin in combination with appropriate depth and duration of burial such that a so-called "petroleum system" may develop within the basin. As an example, a basin may include some amount of shale, which may be of interest for shale gas exploration and production. Various technologies, techniques, etc. described herein may, for example, facilitate assessment of resources in a basin and development of a basin for production of such resources.

SUMMARY

A method includes receiving data where the data include data for a plurality of factors associated with a plurality of wells; training a regression model based at least in part on the data and the plurality of factors; outputting a trained regression model; and predicting production of a well via the trained regression model. A system can include a processor; memory operatively coupled to the processor; and instructions stored in the memory and executable by the processor to instruct the system to: receive data where the data include data for a plurality of factors associated with a plurality of wells; train a regression model based at least in part on the data and the plurality of factors; output a trained regression model; and predict production of a well via the trained regression model. One or more computer-readable storage media can include computer-executable instructions to instruct a computing system to: receive data where the data include data for a plurality of factors associated with a plurality of wells; train a regression model based at least in part on the data and the plurality of factors; output a trained regression model; and predict production of a well via the trained regression model. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
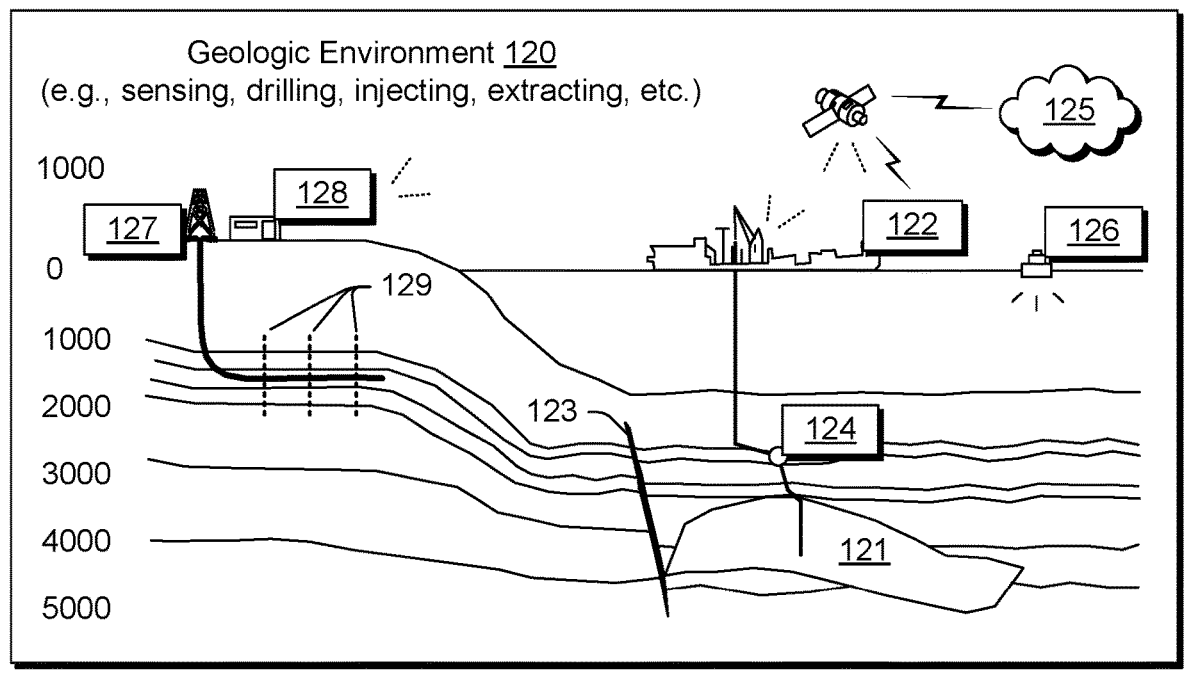
FIG. 1 illustrates examples of equipment in a geologic environment.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc., for fracturing, seismic sensing, analysis of seismic data, assessment of one or more fractures, injection, production, etc. As an example, the equipment 127 and/or 128 may provide for measurement, collection, communication, storage, analysis, etc., of data such as, for example, production data (e.g., for one or more produced resources). As an example, one or more satellites may be provided for purposes of communications, data acquisition, etc.

Geologic formations such as in, for example, the geologic environment 120, include rock, which may be characterized by, for example, porosity values and by permeability values. Porosity may be defined as a percentage of volume occupied by pores, void space, volume within rock that can include fluid, etc. Permeability may be defined as an ability to transmit fluid, measurement of an ability to transmit fluid, etc.

The term "effective porosity" may refer to interconnected pore volume in rock, for example, that may contribute to fluid flow in a formation. As effective porosity aims to exclude isolated pores, effective porosity may be less than total porosity. As an example, a shale formation may have relatively high total porosity yet relatively low permeability due to how shale is structured within the formation.

As an example, shale may be formed by consolidation of clay- and silt-sized particles into thin, relatively impermeable layers. In such an example, the layers may be laterally extensive and form caprock. Caprock may be defined as relatively impermeable rock that forms a barrier or seal with respect to reservoir rock such that fluid does not readily migrate beyond the reservoir rock. As an example, the permeability of caprock capable of retaining fluids through geologic time may be of the order of about $10^{-6}$ to about $10^{-8}$ D (darcies).

The term "shale" may refer to one or more types of shales that may be characterized, for example, based on lithology, etc. In shale gas formations, gas storage and flow may be related to combinations of different geophysical processes. For example, regarding storage, natural gas may be stored as compressed gas in pores and fractures, as adsorbed gas (e.g., adsorbed onto organic matter), and as soluble gas in solid organic materials.

Gas migration and production processes in gas shale sediments can occur, for example, at different physical scales. As an example, production in a newly drilled wellbore may be via large pores through a fracture network and then later in time via smaller pores. As an example, during reservoir depletion, thermodynamic equilibrium among kerogen, clay and the gas phase in pores can change, for example, where gas begins to desorb from kerogen exposed to a pore network.

Sedimentary organic matter tends to have a high sorption capacity for hydrocarbons (e.g., adsorption and absorption processes). Such capacity may depend on factors such as, for example, organic matter type, thermal maturity (e.g., high maturity may improve retention) and organic matter chemical composition. As an example, a model may characterize a formation such that a higher total organic content corresponds to a higher sorption capacity.

With respect to a shale formation that includes hydrocarbons (e.g., a hydrocarbon reservoir), its hydrocarbon producing potential may depend on various factors such as, for example, thickness and extent, organic content, thermal maturity, depth and pressure, fluid saturations, permeability, etc. As an example, a shale formation that includes gas (e.g., a gas reservoir) may include nanodarcy matrix permeability (e.g., of the order of $10^{-9}$ D) and narrow, calcite-sealed natural fractures. In such an example, technologies such as stimulation treatment may be applied in an effort to produce gas from the shale formation, for example, to create new, artificial fractures, to stimulate existing natural fractures (e.g., reactivate calcite-sealed natural fractures), etc. (see, e.g., the one or more fractures 129 in the geologic environment 120 of FIG. 1).

Shale may vary by, for example, one or more of mineralogical characteristics, formation grain sizes, organic contents, rock fissility, etc. Attention to such factors may aid in designing an appropriate stimulation treatment. For example, an evaluation process may include well construction (e.g., drilling one or more vertical, horizontal or deviated wells), sample analysis (e.g., for geomechanical and geochemical properties), open-hole logs (e.g., petrophysical log models) and post-fracture evaluation (e.g., production logs). Effectiveness of a stimulation treatment (e.g., treatments, stages of treatments, etc.) may determine flow mechanism(s), well performance results, etc.

As an example, a stimulation treatment may include pumping fluid into a formation via a wellbore at pressure and rate sufficient to cause a fracture to open. Such a fracture may be vertical and include wings that extend away from the wellbore, for example, in opposing directions according to natural stresses within the formation. As an example, proppant (e.g., sand, etc.) may be mixed with treatment fluid to deposit the proppant in the generated fractures in an effort to maintain fracture width over at least a portion of a generated fracture. For example, a generated fracture may have a length of about 500 ft (e.g., about 150 m) extending from a wellbore where proppant maintains a desirable fracture width over about the first 250 ft (e.g., about 75 m) of the generated fracture.

In a stimulated shale gas formation, fracturing may be applied over a region deemed a "drainage area" (e.g., consider at least one well with at least one artificial fracture), for example, according to a development plan. In such a formation, gas pressure (e.g., within the formation's "matrix") may be higher than in generated fractures of the drainage area such that gas flows from the matrix to the generated fractures and onto a wellbore. During production of the gas, gas pressure in a drainage area tends to decrease (e.g., decreasing the driving force for fluid flow, for example, per Darcy's law, Navier-Stokes equations, etc.). As an example, gas production from a drainage area may continue for decades; however, the predictability of decades long production (e.g., a production forecast) can depend on many factors, some of which may be uncertain (e.g., unknown, unknowable, estimated with probability bounds, etc.).

Various shale gas formations have and are producing gas economically, which has widened interest gas production in other areas. For example, several shale gas exploration projects are under-way in diverse regions of the world, including Europe and Africa. However, a lack of understanding of various elements controlling well productivity, and limitations of available tools to adequately characterize a shale gas formation and forecast production from wells drilled therein, can make it more difficult to predict likely commercial value of a project. Factors that may impact a value assessment may include, for example, drilling costs, associated number of wells to develop a shale gas region, production return that each well can deliver, etc.

Figure 2:
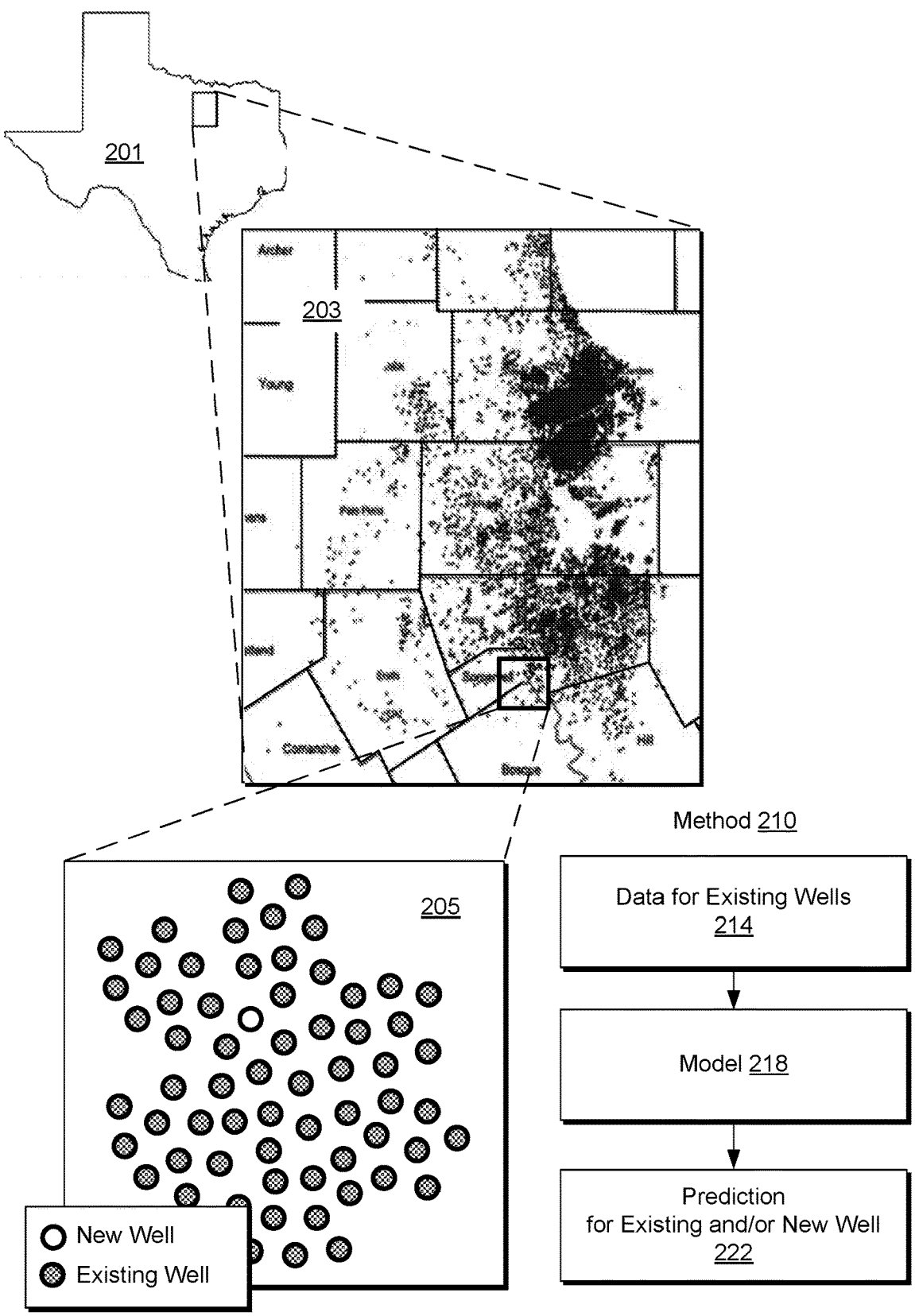
FIG. 2 illustrates an example of a geologic environment and an example of a method.

FIG. 2 shows an example of a field 201, an example of well locations 203 in the field 201, an example of a new well location with respect to existing wells 205 in the field 201 and an example of a method 210.

In the example of FIG. 2, the field 201 may be part of a geologic environment such as the Bend Arch-Fort Worth Basin. The field 201 may include the Barnett shale formation, for example, including sedimentary rocks of Mississippian age (e.g., about 354 to about 323 million years ago). The formation may underlie about 5,000 square miles (e.g., about 13,000 square kilometers), for example, where boundaries in the well locations graphic 203 may be those of counties.

Some estimates indicate that the Barnett shale formation may include as much as about $30\times10^{12}$ cubic feet (e.g., about 850 cubic kilometers) of natural gas resources. The Barnett shale formation may be classified, at least in part, as a "tight" gas reservoir, for example, amenable to stimulation treatment (e.g., fracturing, etc.).

The method 210 includes a data block 214 for providing data for existing wells, a model block 218 for generating a model using at least a portion of the data for the existing wells and a prediction block 222 for predicting production for an existing well and/or a new well (e.g., an actual or a proposed new well). In such an example, a new well may be a well for which some production data are available, for example, for at least one interval of time where, for example, an interval may be a day, days, a week, weeks, a month, months, a year, years, etc.

As an example, the method 210 may include consideration of Well A, which has been drilled with production commencing in year 20XX where production had been observed and recorded until a current date, which can be one year later than year 20XX. The method 210 can include forecasting where a forecast predicts the accumulated production up to year 20XX+2 years.

As an example, the method 210 may include type-curve analysis. Type-curve analysis may be applied, for example, for quantifying well and reservoir parameters such as permeability, skin, fracture half-length, dual-porosity parameters, and others, by comparing pressure change and its derivative of acquired data (e.g., data for existing wells) to reservoir model curve families, called "type curves". In such an example, where a match is found between data for a well and a type curve, the parameters that characterize the behavior of the model providing a match may be deemed to have been determined. For example, where data are available for a new well for an interval of time, the data with respect to time may be used for matching a type curve where that matched type curve may be used to predict production from the new well for a future interval of time.

As an example, the method 210 may be part of a workflow that aims to include estimating ultimate recovery, which may be abbreviated as EUR (Estimated Ultimate Recovery). EUR can be defined as the amount of oil and gas expected to be economically recovered from a well, wells, a reservoir, a field, or a basin by the end of its or their producing life of lives.

To arrive at a EUR value, a method may include performing one or more analyses, which can range from a decline curve analysis (e.g., when pressure data is not available) to more sophisticated and more resource consuming methods like rate transient analysis and numerical production simulation. Decline curve analysis can involve fine-tuning by experts to each well and best fitting of a dense time-series of specific production data. Where predictions are made on a young well, decline curves may tend to perform poorly as an insufficient amount of data may fail to make a trend apparent. A poor fit to time series data can lead to a poor prediction. As to an unconventional environment, decline curve analysis may violate one or more assumptions that can impact its adherence to underlying physics. Simulations that include physics-based models may produce better predictions; however, they can be computationally expensive and/or time consuming (e.g., estimates may be rate determining when making decisions in the field).

As an example, a method can include implementation of machine learning (ML), which can take advantage of accumulated knowledge, particularly in unconventional oil and gas production (e.g., North America has more than 4 million wells drilled and more than one million of them are in unconventional formations).

As an example, a method can be implemented to predict production for a well where the method includes receiving production data for the well for a period of time of the order of months. For example, such a method can include receiving production data for the first three months of a well's productive life and based at least in part on the production data can include predicting an EUR value for the well. Such a method may characterize flow of a well based at least in part on, for example, approximately three months of production data.

As an example, a method can include accounting for various physical characteristics of a well, a formation, equipment in a well (e.g., completions equipment), etc. A method may account for aspects of dynamics of a reservoir, equipment installed in a well, quality and installation capabilities with respect to a well, etc.

As an example, a method may be implemented for a plurality of wells. For example, consider a method that includes making predictions for more than one hundred wells in less than one second of computation time. As an example, consider a method that can include making predictions for a thousand wells or more in less than one second of computation time. Such a method can allow for an assessment of the possible production of an entire reservoir or field.

Various embodiments may provide one or more methods, one or more computing systems, or one or more computer-readable media for forecasting production of hydrocarbon wells (e.g., including unconventional wells), using a few months of initial production. As an example, a method can include augmenting a forecast with non-production well data and training a machine learning prediction model using such data along with production data. In such an example, the forecast may be a long-term production forecast of the well.

As an example, a method can include utilizing one or more data analytics techniques to enrich data for unconventional plays development and/or production. Such a method can then apply one or more exploratory data analysis techniques to interpret tens of geological, geolocational, completion and drilling parameters and variables, and external factors influencing production. For example, consider utilizing at least three factors, which may be more than approximately 5 factors, more than approximately 10 factors, more than approximately 20 factors, more than approximately 30 factors, etc. As an example, a method can include utilizing approximately 50 factors. Such factors may be utilized to build one or more data driven predictive models of production using one or more machine learning tools.

With demand for unconventional well products expected to rise worldwide, there is considerable value in faster and more accurate prediction methods, particularly as future production, including, for example, EUR. In various embodiments, a model can utilize input data about a well and output a forecasted value for total oil and/or gas production of that well. For example, a method can include rapidly and accurately making production estimates on wells for asset evaluations, which can include calculation of Estimate Ultimate Recovery (EUR) using a couple to a few months of initial production. In such an example, output may be used, for example, to estimate under-performance of one or more wells. Such an approach can accelerate the selection of candidate wells for intervention by pointing a production engineer to one or more wells that may warrant further investigation. As an example, consider a workflow where a production engineer makes a selection of wells for intervention where such intervention may include one or more of re-fracturing, acidizing and/or one or more other well treatments. As an example, output may be used for forecasting a large number of wells as part of a field or a geographical region. In such an example, the output may be available for assessment by an engineer in a relatively short period of time (e.g., consider output for an assessment of one hundred wells or more (e.g., up to several thousand wells) where the output is provided in less than approximately one minute).

Figure 3:
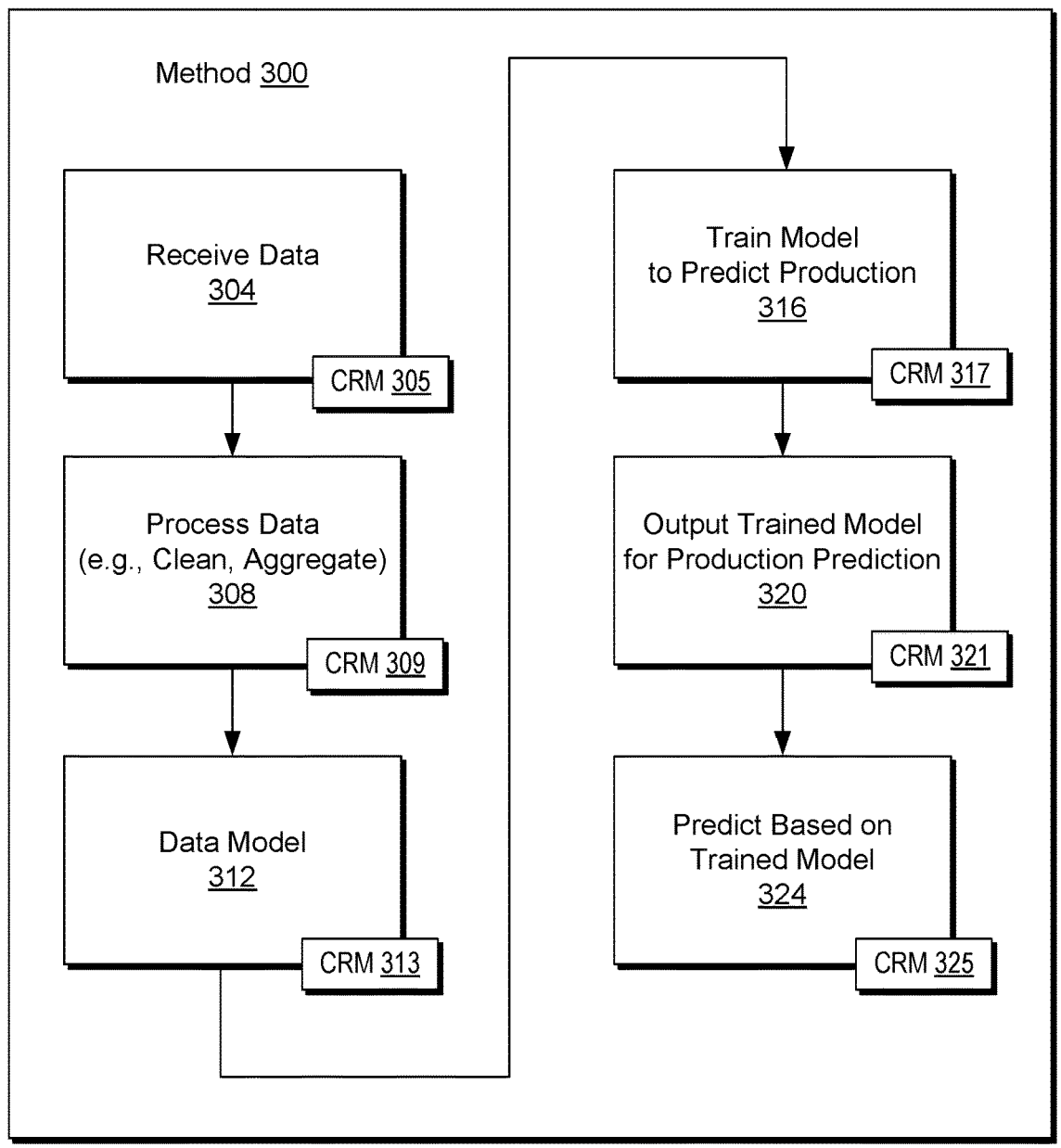
FIG. 3 illustrates an example of a method and an example of a system.
Figure 3:
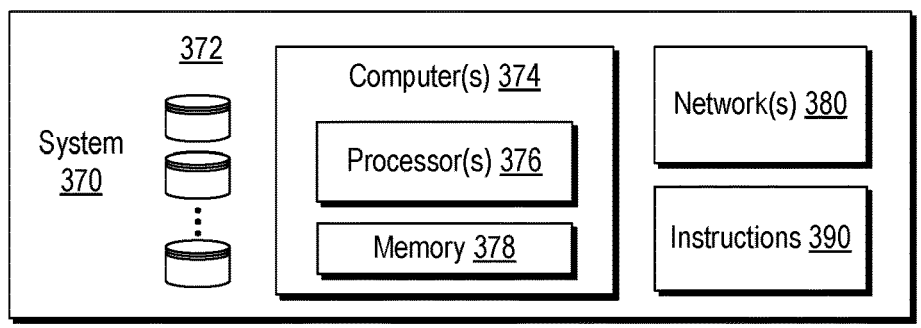

FIG. 3 shows an example of a method 300 that includes a reception block 304 for receiving data where the data can include data for a plurality of factors associated with a plurality of wells, a process block 308 for processing at least a portion of the data, a data modeling block 312 for data modeling, a training block 316 for training the model to predict production (e.g., or production values) based at least in part on the data modeling (e.g., based at least in part on at least a portion of the plurality of factors), an output block 320 for outputting the model as a trained model for production prediction, and a prediction block 324 for predicting one or more production values based at least in part on the trained model. In such an example, the prediction block 324 can include receiving information as to an existing well and/or as to a new well (e.g., a proposed well, a partially drilled well, etc.) and based at least in part on at least a portion of the received information predicting production for the existing well and/or the new well. In such an example, the received information may include production data or may not include production data. As an example, received information for a subject well for which a production prediction is desired may include information as to multiple factors associated with the subject well. In such an example, the information may include time dependent information such as, for example, production data and/or one or more other types of time dependent information.

In the example of FIG. 3, data can be received as to production. For example, the reception block 304 can include receiving production data along with data for a plurality of factors for at least a portion of the plurality of wells. In such an example, the production data can be utilized for purposes of training a model per the training block 316 and optionally for validating a model and/or testing a model. As an example, a portion of production data may be factor data, for example, as to an initial rate of production of a well or initial production rates of wells. As to production data for purposes of training, such production data can extend beyond an initial period of time to a time for which a production prediction or production predictions are desired (e.g., a time of months, a time of years, etc.). Training of a model can include making production predictions, comparing the production predictions to actual productions and revising the model to "tune" the model such that the production predictions better match the actual productions. As an example, a method can include withholding a portion of data where the withheld portion may be for purposes of testing and/or validating. In such an example, a model can be built and trained and then tested and/or validated using one or more withheld portions of data.

In the example of FIG. 3, the trained model as output per the output block 320 may be suitable for predicting production(s) for a subject well based on factor data and production data for the subject well, such as, for example, production data for a couple months or a few months for the subject well. Alternatively, or additionally, the trained model may be suitable for predicting production(s) of a subject well based on factor data without use of production data for the subject well (e.g., consider a scenario where production has not yet commenced for the subject well).

As an example, as to using a trained model, one of the inputs can be production data such as production data for a few months. As an example, as to using a trained model, input can be for various factors that may be for factors other than production data (e.g., zero months or no production data). In various examples, inclusion of some production data (e.g., a month, a couple of months or a few months) as to input for a trained model may provide for more accurate predictions by the trained model.

In the example of FIG. 3, the method 300 includes various computer-readable medium (CRM) blocks 305, 309, 313, 317, 321 and 325, which can include computer-executable (e.g., processor-executable) instructions for performing at least a portion of one or more actions of the blocks 304, 308, 312, 316, 320 and 324, respectively. As an example, a CRM can be a computer-readable storage medium that is a physical component that is not a signal, not a carrier wave and that is non-transitory.

In the example of FIG. 3, the system 370 includes one or more memory storage devices 372 (e.g., one or more memory components), one or more computers 374, one or more networks 380 and one or more sets of instructions 390. As to the one or more computers 374, each computer may include one or more processors (e.g., or cores) 376 and memory 378 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, various blocks of the method 300 may be associated with one or more sets of instructions such as, for example, the one or more sets of instructions 390 of the system 370. In such an example, execution of the instructions may cause a system to perform various acts (e.g., a method, etc.). As an example, the system 370 may be configured to output one or more control signals, for example, to control equipment (e.g., exploration equipment, production equipment, etc.). As an example, the system 370 may be part of and/or operatively coupled to equipment illustrated in FIG. 1.

As an example, a method may include acquiring data using field equipment where such data are germane to production of fluid from a reservoir. As an example, a method can include receiving acquired data. For example, consider the reception block 304 of the method 300 of FIG. 3 as receiving acquired data.

As an example, input data can be gathered about existing wells in a field or basin. Such input data may be of a type of data that is suspected to be a factor in production of fluid from a well that may be included in a model. For example, consider a workflow that includes the following data types: completion data, reservoir data, operation data (e.g. name of operator, etc.), human data (e.g. oil price at time of production start), latitude, longitude, lateral length, vertical depth including max total vertical depth, azimuth including mean azimuth, reference elevation, lateral length gross perforation interval, total fluid, total proppant, number of fracturing stages, first 3 (or another number) months of oil production, first 3 (or another number) months of water production, first 3 (or another number) months of gas production, initial production rates and so on. As an example, inputs for a model may be raw data and/or processed data (e.g., values derived from raw data). As an example, sine and cosine of mean azimuth of trajectory of a well may be inputs. Input data may be received and/or acquired from one or more sources of information (e.g., public and/or private). As to a factor or factors that are for production (e.g., production values), such a factor or factors may be referred to as a production data-based factor or factors; whereas, other types of factors may be non-production data-based factors (e.g., consider geometric factors, equipment factors, hydraulic fracturing factors, etc.). Referring again to the example of FIG. 3, the data modeling block 312 can provide for associating data with factors (e.g., model factors).

As an example, a source of oilfield information may be an oilfield aggregator. As to an aggregator of data, consider as examples the IHS Well Database, which includes data for wells drilled and produced back to 1859, and FracFocus, which is the US national hydraulic fracturing chemical registry and includes information for wells.

As an example, a method can include building and training one or more statistical regression models. For example, a method can include building one or more random forests or other types of regression models.

As an example, random forest can be a type of a single statistical regression model. As an example, a forecasting method can include utilizing multiple random forests. For example, a method can include breaking a problem down into multiple statistical regression models, which may be a plurality of random forests and/or other types of regression models.

As an example, a problem may be formulated for making forecasts in a field that includes hundreds of three year old wells. In such an example, a new well can be drilled in the field and commence production. Given the first three months of production of the new well, a forecast is desired for how much fluid the new well will produce after three years. As the field includes hundreds of three year old wells, production and other data are available for a large percentage of those hundreds of three year old wells. In such an example, a method can include training a single machine learning (ML) regression model (e.g. a random forest) using at least a portion of the available data, which may, for example, be subjected to data cleansing. Such a method can include outputting a trained regression model (e.g., a trained random forest model) that can be utilized to make predictions as to production of the "young" three month old well, as a recently drilled "new" well.

As another example, a problem may be formulated for that same field where the hundreds of three year old wells do not include older wells and where it is desired to a make a prediction as to production for the newly drilled well but for an age of the newly drilled well that is greater than approximately three years, for example, consider a desire to make a prediction as to production for the newly drilled well at an age of ten years (e.g., seven years beyond the age of the existing three year old wells at a time when those wells will be thirteen years old). In such an example, as data for wells that are ten years old is lacking, training of a machine learning regression model to predict ten years ahead can raise some issues. In such an example, however, an assumption may be made that decline curves can adequately "model" production behavior for a given period of time (e.g., one year, ten years, etc.). Yet, such an assumption cannot overcome the fact that decline curves may perform poorly given a scant amount of production versus time data (e.g., such as three months of data from a newly drilled well). In other words, decline curves tend to perform better when based on a more extensive amount of production versus time data (e.g., three years or more of production versus time data).

As an example, to overcome data insufficiencies as associated with decline curves, a method can include training a ML regression model on available historical data to predict production after 4 months from 3 months of data. In such an example, the method can include training another ML regression model on the same data to predict production after 5 months from 3 months of data, can include training a third ML regression model to predict production after 6 months and so on, to a desired number of months. As an example, a method can include "daisy chaining" regression models to predict production for a number of intervals.

As an example, a method can include training a plurality of ML regression models where each model accounts for a period of time such as, for example, a month of production time. As an example, consider a method that includes training 33 ML regression models to predict production in each of the months in a range from 4 months to 36 months. As an example, a method can include fitting a production curve to production data predicted by a plurality of regression models (e.g., machine learning regression models).

As an example, a method can use a trained model, as trained on production data for a 3 month old well and "generate" predicted productions for individual months (e.g., or other suitable intervals) from the 4th month to the 36th month. In such an approach, a forecast has, effectively, 36 months of data such that a method can include fitting a decline curve to the generated data (e.g., and optionally the three months of production data). Such a method can further include using the decline curve to make predictions, for example, arbitrarily far into the future. Such a forecast can be of increased accuracy because the decline curve is based on a sufficient amount of production versus time data, albeit, generated data from a series of trained ML regression models. For example, a method can include fitting a decline curve to 36 months of data or more where such data includes generated data from a plurality of ML regression models. Such a decline curve may be expected to perform better than a decline curve that is based solely on three months of actual production versus time data.

As an example, a method can include predicting production at a first time-scale and/or predicting production at a second, greater time-scale. As to the latter, the method can include fitting a decline curve to production versus time data where a percentage (e.g., more than 20 percent, more than 40 percent, more than 60 percent, more than 80 percent, etc.) of the production versus time data is generated using a plurality of ML regression models. Such an approach can be utilized to predict production quite far into the future (e.g., including EUR), particularly in instances where an amount of actual production versus time data is insufficient to provide for an acceptably accurate fit of a decline curve (e.g., when such a decline curve may be expected to perform poorly).

As an example, a method can include implementing an ensemble technique based on decision trees for building a statistical regression model. In such an example, the model can be trained using received data as input and actual production data of one or more wells in a field as a target(s). As an example, the blocks 312 and 316 of the method 300 may include utilizing an ensemble technique based at least in part on decision trees for building a statistical regression model. Such a model may be a boosted tree model (see, e.g., Friedman, Greedy Function Approximation: A Gradient Boosting Machine, The Annals of Statistics, Vol. 29, No. 5, October 2001, which is incorporated by reference herein).

As to examples of regression models that may be utilized, consider one or more of the following: linear regression, ridge regression, Huber regression, Random Forest Regression, Gradient Boosted Random Forest Regression, Neural Network regression, lasso regression, and locally weighted linear regression.

As an example, a method can include performing function estimation/approximation in a function space where a connection can be made between stage-wise additive expansions and steepest—descent minimization. As an example, a gradient descent "boosting" paradigm can provide for additive expansions based on one or more fitting criterion. As an example, individual additive components can be regression trees. Gradient boosting of regression trees can produce robust, interpretable procedures for regression and/or classification, which may be suitable for clean data and/or unclean data.

As explained with respect to the block 324 of the method 300 of FIG. 3, a trained model that is output (e.g., generated) may be utilized given input data about one or more wells in a field. For example, a few months of production data may be acquired for one or more wells where such production is for the first few months of production life of such one or more wells. As an example, a trained model can be utilized in an inference mode for predicting future production of one or more wells (e.g., new and/or young wells). As an example, multiple instances of the method 300 may be implemented in series and/or parallel for prediction of production versus time for a plurality of wells.

Figure 4:
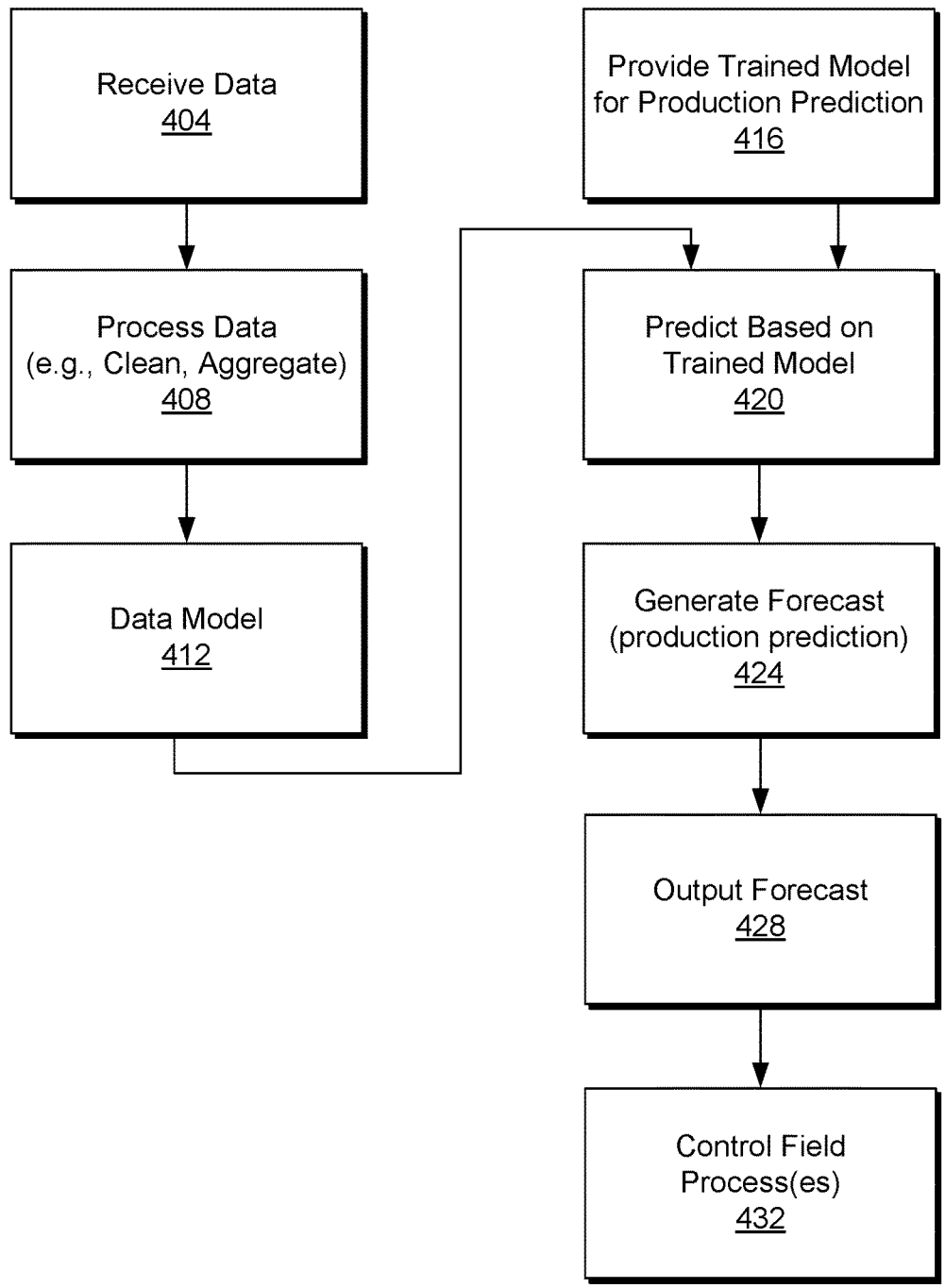
FIG. 4 illustrates an example of a method.

FIG. 4 shows an example of a method 400 that includes a reception block 404 for receiving data (e.g., for a subject well), a process block 408 for processing at least a portion of the received data (e.g., cleaning, aggregating, etc.), a data model block 412 for data modeling, a provision block 416 for providing a trained model for production prediction (see, e.g., the block 320 of the method 300 of FIG. 3), a prediction block 420 for predicting production based on the trained model and the data modeling (e.g., based at least on a portion of the received data), a generation block 424 for generating a forecast based at least in part on one or more predictions of the trained model, an output block 428 for outputting a forecast, and a control block 432 for controlling one or more field processes based at least in part on the forecast. In such an example, the controlling may include controlling at least one piece of equipment that is positioned in a field (see, e.g., the geologic environment 120 of FIG. 1 and the various equipment). For example, a method can include controlling one or more of drilling equipment, data acquisition equipment, casing equipment, hydraulic fracturing equipment, injection equipment, artificial lift equipment, fluid network gathering and/or distribution equipment, separation equipment, etc.

In the example of FIG. 4, the received data can be for one or more factors associated with a subject well where a production prediction is desired for that subject well. In such an example, the data may include production data, which may be for a number of months, which may be a few months (e.g., less than or equal to approximately three months). As an example, received data may include data that does not include production data for the subject well. Such data may include data as to multiple factors, which may be, for example, one or more of multiple factors utilized in training the trained model. As an example, a model can be a regression model such as, for example, a machine learning regression model.

Figure 5:
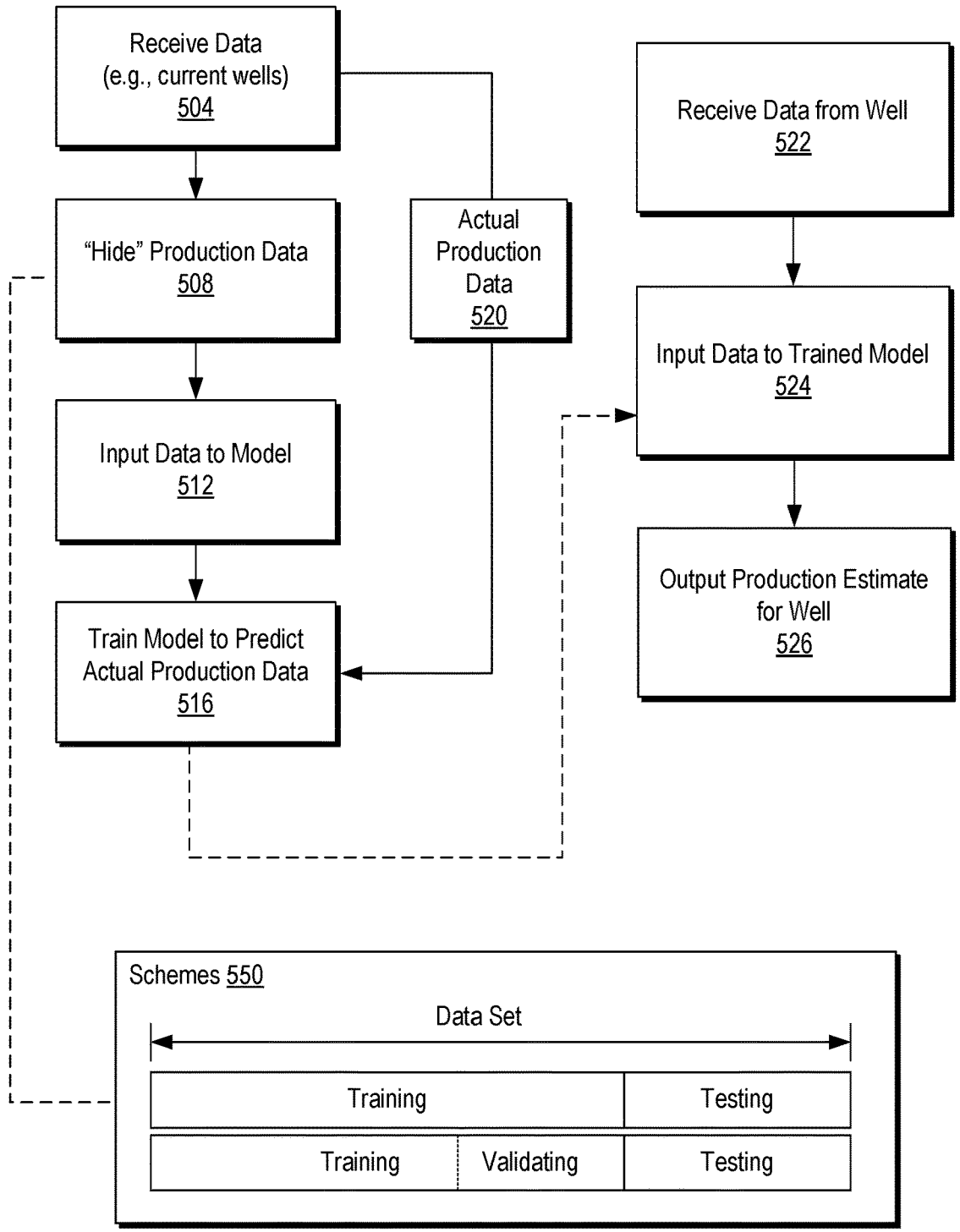
FIG. 5 illustrates an example of a method and examples of schemes associated with data set partitioning.

FIG. 5 shows an example of a method 500 that includes a reception block 504 for receiving data (e.g., for current wells), a hide block 508 for hiding production data, an input block 512 for inputting data to model, a training block 516 for training a model to predict actual production data (e.g., to estimate or generate production data), and an actual production data block 520 for providing actual production data (e.g., as received data from a well or wells, etc.) to the training block 516 for purposes of training the model. In the example of FIG. 5, the block 516 of the method 500 can include outputting a trained model.

FIG. 5 also shows examples of schemes 550 as to partitioning a data set. As mentioned, a method can include withholding a portion of data where the withheld portion may be for purposes of testing and/or validating. In such an example, a model can be built and trained and then tested and/or validated using one or more withheld portions of data. The schemes 550 include an example where a data set is partitioned into a portion for training and a portion for testing and include another example where a data set is partitioned for training and validating portions and for a testing portion. In the example of FIG. 5, the hide block 508 may "hide" a portion of production data, for example, for purposes of testing. As an example, training data may be earlier in time data when compared to testing data (e.g., the schemes 550 can be versus time from early (left) to later (right)).

As shown in FIG. 5, the method 500 can include a reception block 522 for receiving data from a well or wells, an input block 524 for inputting data to a trained model (e.g., as output by the training block 516), and an output block 526 for outputting a production estimate for the well or production estimates for the wells. In such an example, the reception block 522 may include receiving production data, particularly where the trained model includes one or more production-based factors (e.g., an initial production rate factor, etc.). Where a production prediction is desired in the absence of actual production data for a subject well (e.g., a drilled well prior to commencement of production, a planned well, etc.), the reception block 522 can include receiving data for factors that are non-production factors of the trained model.

As an example, a method can include a calculation stage and a data cleansing stage. In such an example, in a calculation stage, one or more useful attributes to be used as input data are calculated from data types collected from one or more wells. As an example, a cleansing stage can include removal of data from the data set of wells that have, for example, incomplete, missing or invalid values. A cleansing stage may also include removal of data from a data set of reallocated or dead wells (see, e.g., FIG. 13). Such a method of cleansing can include removal of one or more wells from a data set of wells. As an example, cleansing can include removal of a portion of data associated with a well or wells.

As an example, total oil production of an unconventional well after 36 months can be predicted given approximately 3 months of oil production data for that well (e.g., note that such an approach can produce predictions from x to y months, where x and y are any pair of numbers where x<y). The result of such a data driven approach for unconventional production forecasting can increase the level of forecast certainty compared to decline curve analysis that relies solely on the 3 months of oil production data. For example, a method can include supplementing actual production versus time data with generated production versus time data and, for example, fitting a decline curve to the actual production versus time data and the generated production versus time data.

As demonstrated, a data-based approach can provide production forecasts for 36 months on a well to well basis with an average error of approximately 14 percent with respect to the actual cumulative production (e.g., for the Eagle Ford basin, the Williston basin and the Permian basin). Such error may be further decreased via addition of domain data and/or simulation results as inputs.

As an example, a machine learning approach can, in relation to a model, extend beyond a relatively basic statistical analysis. For example, using input data and production histories of old wells, a model can build an optimized decision surface. Such a decision surface can be multi-dimensional and attempt to closely match actual well production. As an example, a decision surface of a boosted tree model can be constructed by splitting wells by commonalities and estimating production for each group. In such an example, ensembles of these trees can be built and a weighted sample taken as a prediction (e.g., a predicted value).

Figure 6:
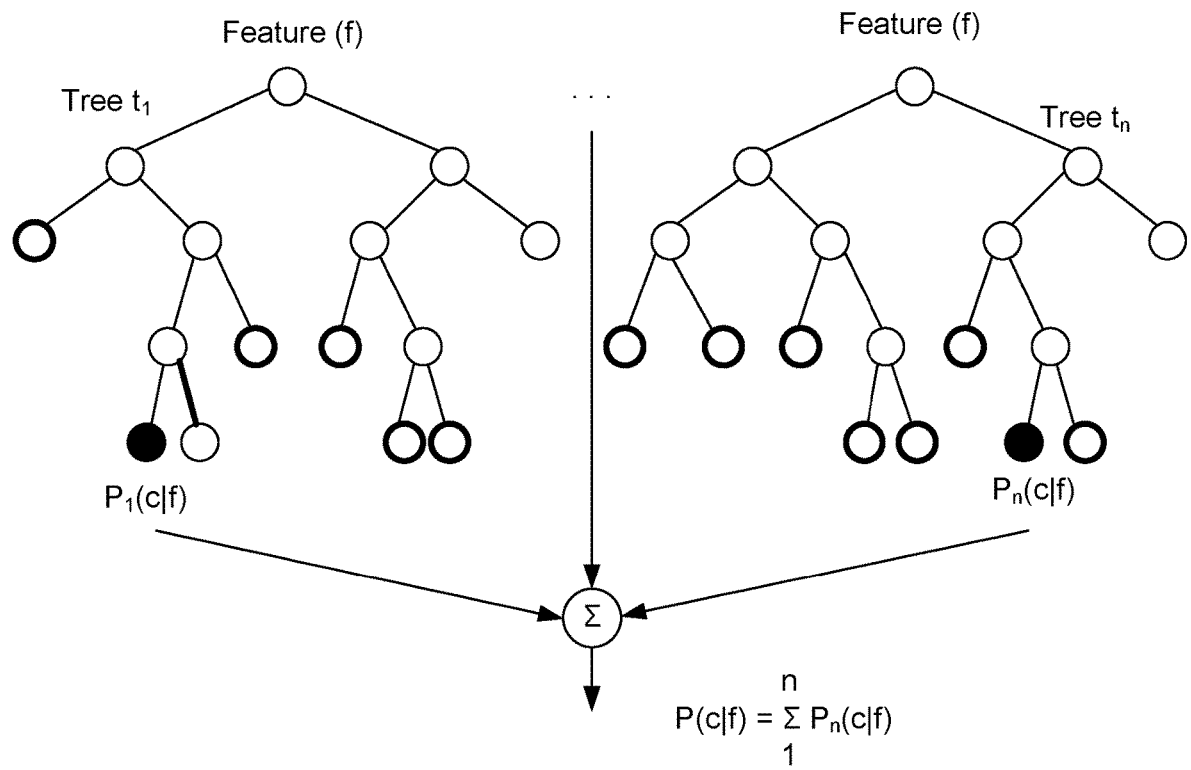
FIG. 6 illustrates an example of a model.

FIG. 6 shows a diagram of an example of a gradient boosted random forest model 600 as a type of regression model. As shown, features exist that can be processed via a tree structure where decisions can be made along branches of the trees to arrive at a respective leaf for each of the features. While two features are illustrated in the example of FIG. 6, the number may be much greater than two. As mentioned, a number of factors can be more than ten, more than twenty, etc. In the example of FIG. 6, as shown, a summation can be made that is based on a leaf (e.g., a leaf probability) of each of a plurality of factors.

Figure 7:
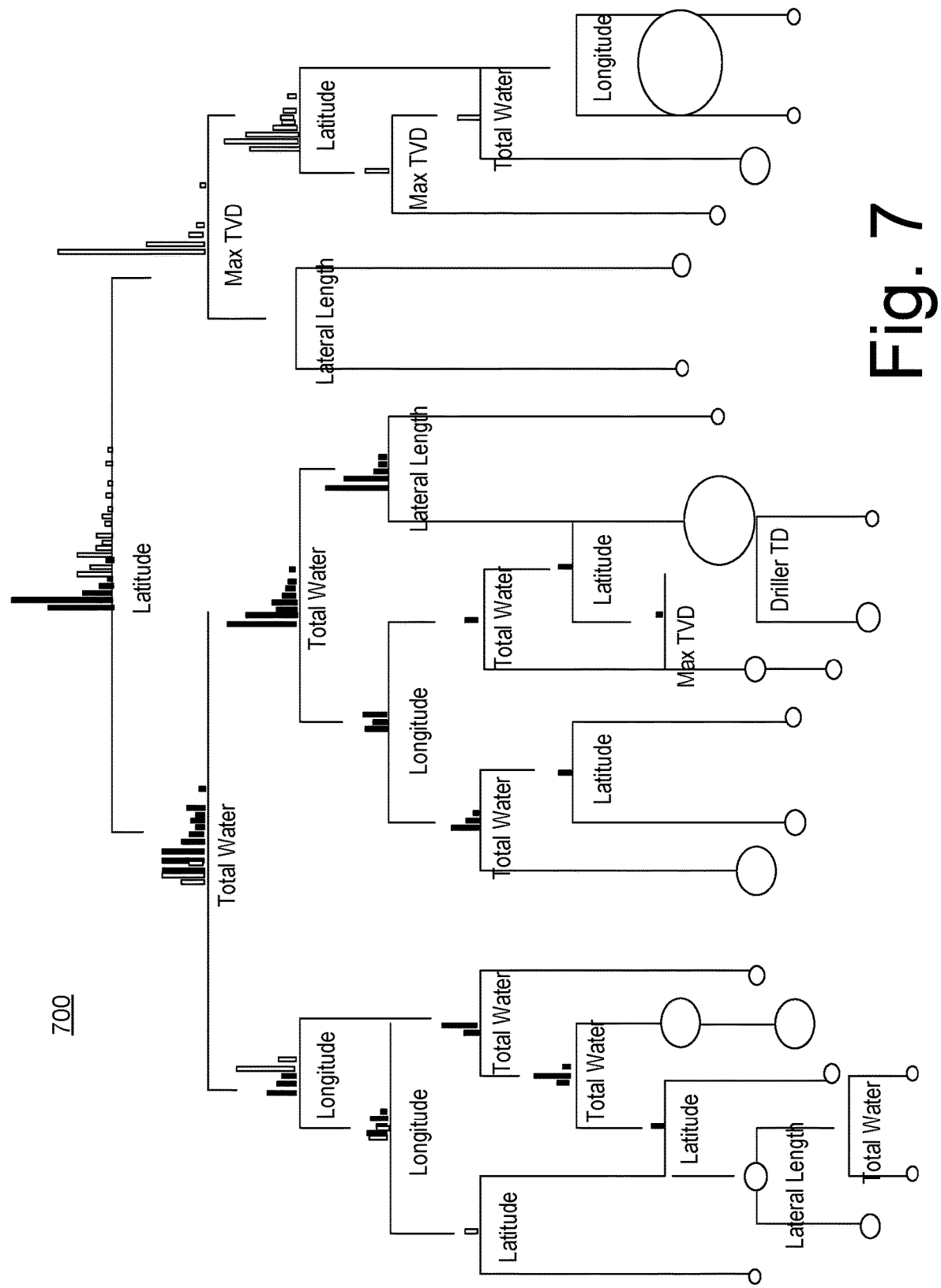
FIG. 7 illustrates an example of a model.

FIG. 7 shows an example of a tree model 700 where factors include factors such as, for example, longitude, latitude, total water, driller total depth (TD), lateral length, and maximum TVD (e.g., true vertical depth). In the example of FIG. 7, a final model can be a weighted average of a large number of such trees.

As to TVD, such a factor can be defined as the vertical distance from a point in a well (e.g., current or final depth) to a point at the surface (e.g., elevation of a rotary kelly bushing (RKB), etc.). A driller may use TVD and measured depth (MD). TVD can be a factor utilized to determine bottom hole pressure (e.g., caused in part by the hydrostatic head of fluid in a wellbore). As to MD, due to intentional or unintentional curves in a wellbore, it is longer than TVD (e.g., MD>TVD).

In FIG. 7, various examples of statistics are illustrated by bar charts, which include two populations (e.g., solid fill and open fill). Such statistics can provide for decision making along a tree to arrive at a leaf (see, e.g., FIG. 6).

Figure 8:
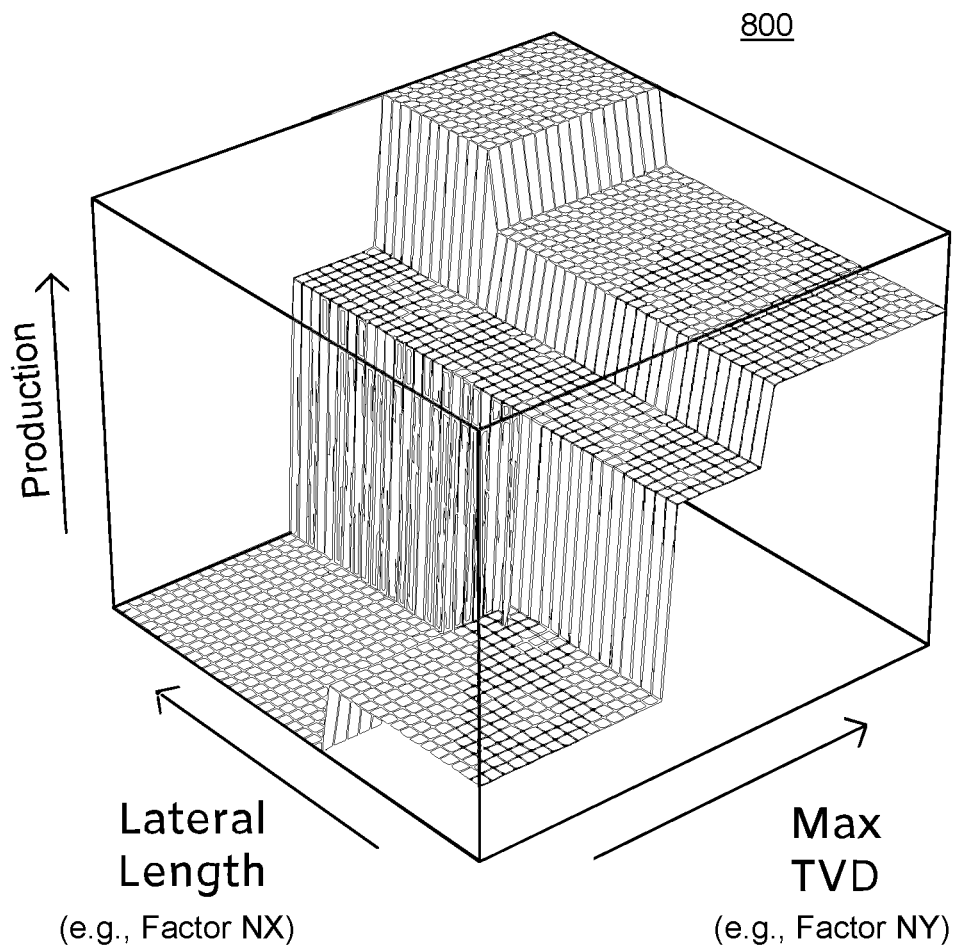
FIG. 8 illustrates an example of a plot.

FIG. 8 shows an example of a plot 800 of a multi-dimensional surface. As mentioned, a tree model such as the tree model 700 of FIG. 7 can include various factors such that the tree model is a multiple factor tree model. As an example, factors can include one or more of an initial production rate, an azimuth (e.g., mean azimuth, etc.), a location, a total fluid, a total proppant, TVD and a lateral length. As an example, factors can include for a well, its initial production rate, its azimuth, its location (e.g., longitude and latitude, etc.), its total fluid, its total proppant, its TVD and its lateral length. As an example, data for a producing well may be data for a number of months where the number of months is greater than zero. Such data can include production data (e.g., fluid production data with respect to time, etc.).

In the plot 800, a production surface is illustrated with respect to values of multiple factors such as, for example, lateral length and maximum TVD. Given data, a machine learning approach can perform statistical analyses to allow a tree model to build an optimized decision surface where the decision surface is multi-dimensional and aims to closely match actual well production.

As an example, a method can include forecasting long term production of unconventional wells using a few months of initial production. In such an example, the method can include augmenting a forecast via receipt of non-production well data. For example, a method can include generating a multiple factor tree model that includes production factors and non-production factors. As an example, a method may include predicting production of a well without receipt of actual production data of the well.

Figure 12:
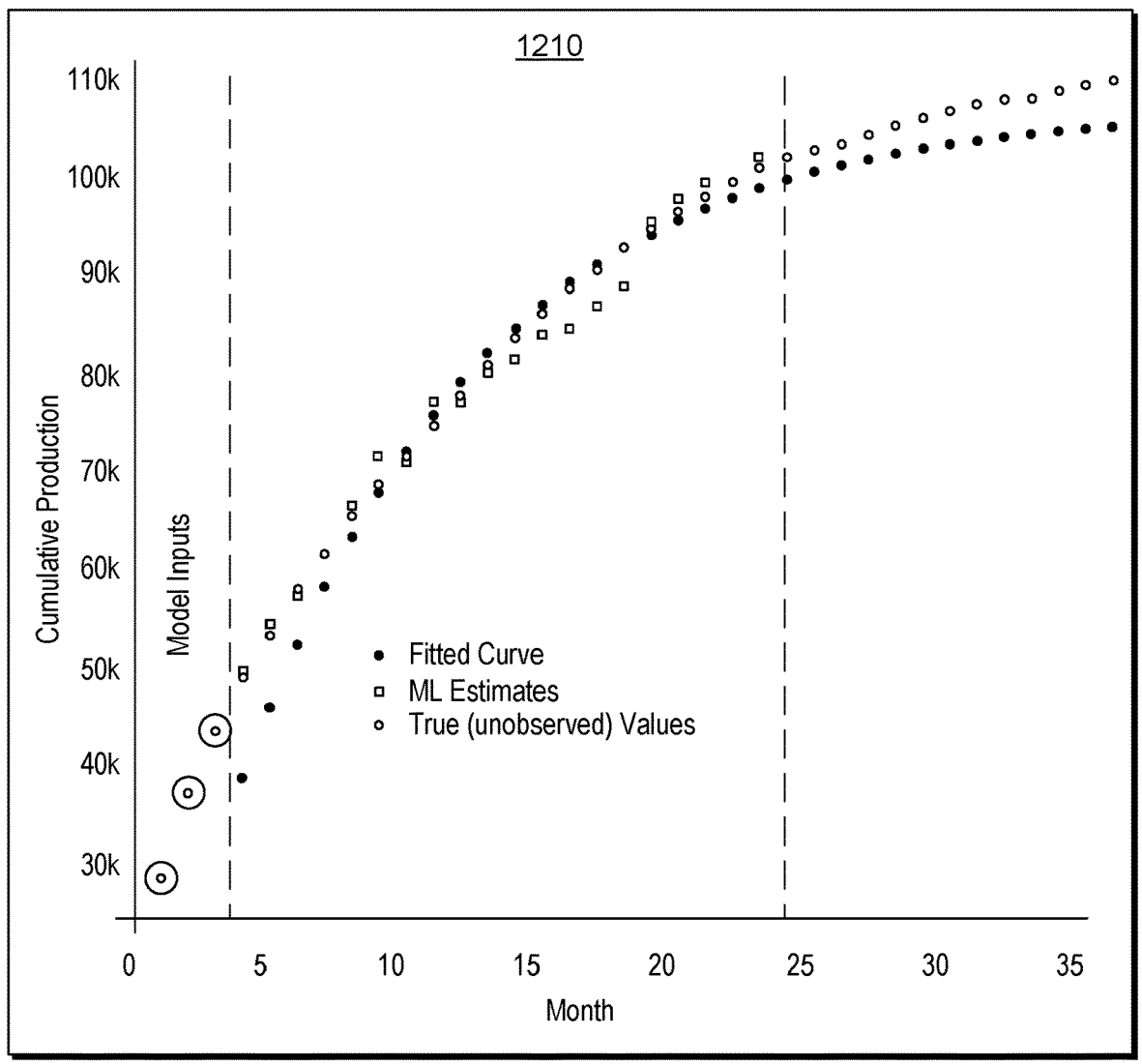
FIG. 12 illustrates an example of a plot and an example of a method.
Figure 12:
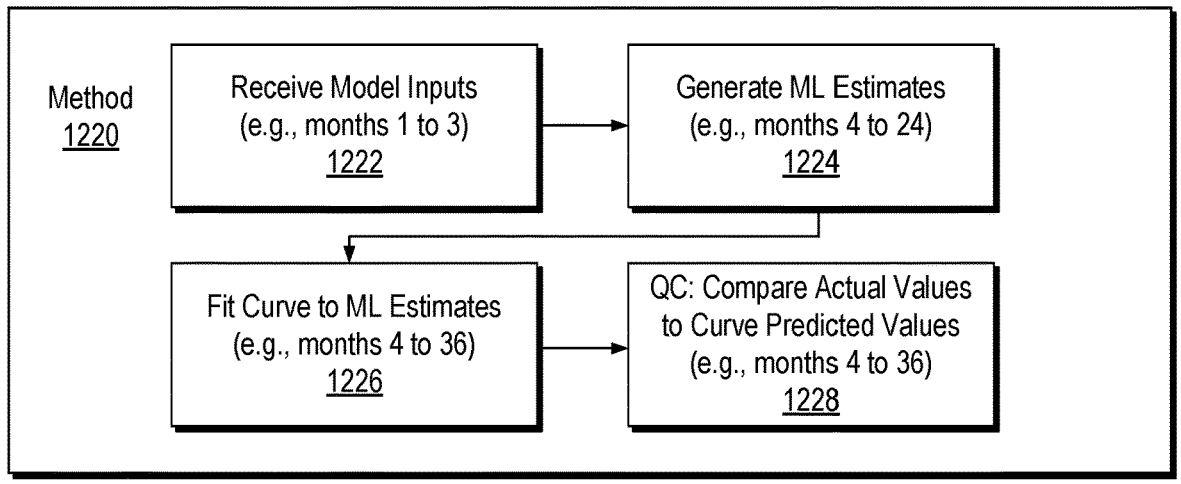

As an example, a method can include determining a value as an estimated ultimate recovery (EUR) of a well using a couple of months of actual initial production data of the well (see, e.g., FIG. 12). As an example, a method can include estimating under-performance of one or more wells, for example, to select one or more candidate wells for intervention (e.g., one or more physical treatments, etc.).

The approach illustrated in FIGS. 7 and 8 was assessed using various measures. One metric for assessment is percentage error of production, defined as: error=|true production−predicted production|/true production. So for example, if a well produced 100,000 barrels of oil and a prediction was 150,000 barrels of oil, the error would be |100-150|/100=50%.

Figure 9:
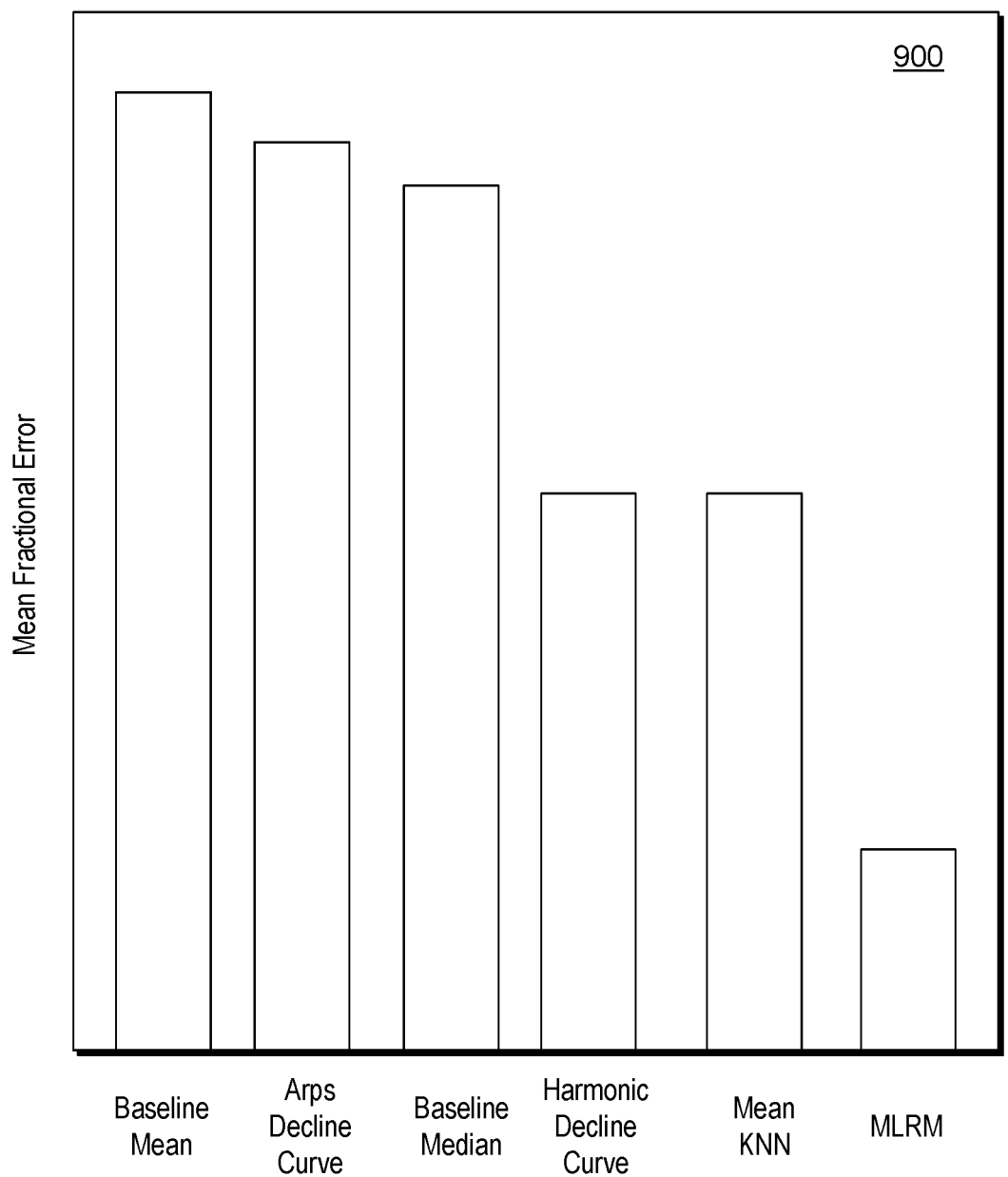
FIG. 9 illustrates an example of a plot.

FIG. 9 shows an example histogram plot 900 of errors for various approaches, including the ML regression model (MLRM) as illustrated and explained with respect to FIGS. 7 and 8. As shown in the plot 900, for instance, the Baseline Mean approach (predicting the mean production of the entire basin for each well) had a production estimation error of 68.2%, the Baseline Median approach (predicting the mean production of the entire basin for each well) had a production estimation error of 58.5%, the Exponential Decline estimation approach had an error of 62.3%, the Harmonic Decline estimation had an error of 39.7%, and the Nearest Neighbor Mean of production estimation approach (Mean KNN) had an error of 39.3%. Each of the approaches had an estimation error that was greater than that given by the MLRM approach (error of 14.2%).

Figure 10:
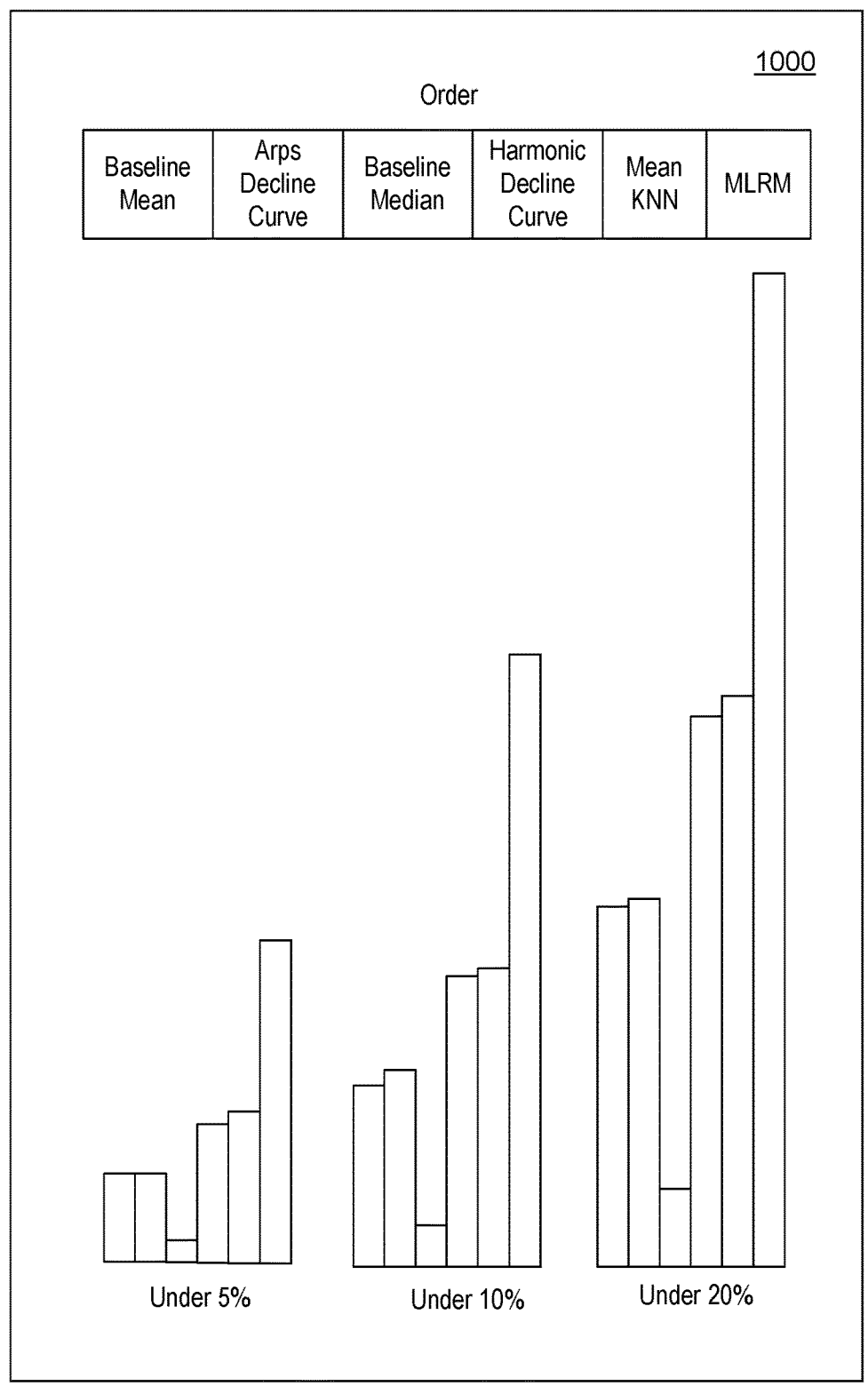
FIG. 10 illustrates an example of a plot.

FIG. 10 shows an example of a plot 1000 that includes fraction of errors below a particular threshold for the various approaches explained with respect to the plot 900 of FIG. 9, where the order of the results is illustrated in a legend at the top of the plot 1000. The plot 1000 shows the fraction of errors under 5%, 10% and 20%. As illustrated, for the MLRM approach, more than 75% of predictions had less than 20% error, while the second best approach had about 45% of its prediction within a 20% error range.

Figure 11:
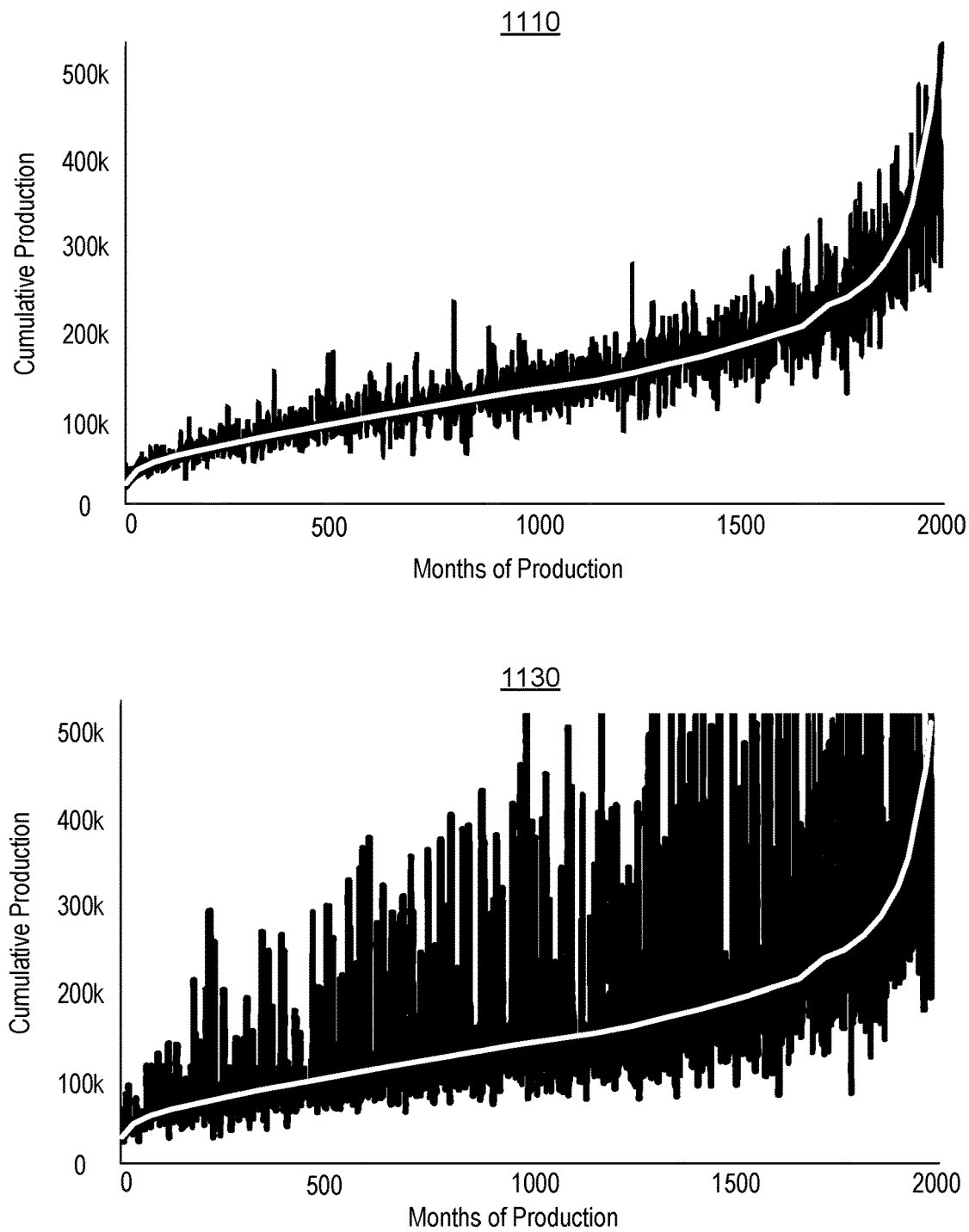
FIG. 11 illustrates examples of plots and equations.

FIG. 11 shows an example of a plot 1110 of predicted versus actual production where the predicted production values are from an MLRM approach. In the plot 1110, predicted production and actual production are plotted for more than 2000 wells. In the plot 1110, each point on a thick white line represents the actual production of a well, while other points show corresponding predicted production values.

FIG. 11 also shows an example plot 1130 for predicted versus actual production values where the predicted production values are from a harmonic decline curve approach. A comparison between the plot 1110 and the plot 1130 demonstrates the accuracy achieved by the MLRM approach as in the plot 1110.

As to the harmonic decline approach, FIG. 11 shows equations 1132 for flow rate and cumulative production, which are for a general hyperbolic decline where variables include:
q=current production rate
$q_i$=initial production rate (start of production)
$d_i$=initial nominal decline rate at t=0
t=cumulative time since start of production
$N_p$=cumulative production being analyzed
b=hyperbolic decline constant (0<b<1)

The equations 1132 represent a general formulation for decline curve analysis where the parameter b determines whether the approach is exponential (b=0) or harmonic (b=1).

The MLRM approach is less noisy than the harmonic decline approach. The MLRM approach exhibits reduced noise in such a comparison due to the number of factors taken into account (e.g., about a well, the environment, etc.). The harmonic decline approach is not as encompassing.

The MLRM approach utilizes a relatively flexible model that can be trained on a desired basin where data are available. As demonstrated in the plots 1110 and 1130, the MLRM approach is robust in that it is less sensitive to noise in production measurements. Such robustness can be obtained by taking into account factors such as non-production data of a well, which can help to stabilize prediction(s). The MLRM approach can accommodate new features and data inputs, as available and/or desired. The MLRM approach can be implemented in scenarios where relatively little production data are available (e.g., a first couple of months of production data), as such, the MLRM approach can be utilized much earlier on in a well's life. As an example, for a basin, a number of wells utilized for training can be approximately one hundred or more, approximately one thousand or more, approximately five thousand or more, etc. where data are available for the number of wells, which may be a data cleansed number of wells. For example, where a basin includes over 10,000 wells, data cleansing may reduce the number of wells by a percentage (e.g., or fraction), which may be a reduction greater than approximately 10 percent yet less than approximately 80 percent (e.g., which may depend on particular factors, particular types of wells to model, particular types of proposed wells, types of technologies to be implemented as to one or more new wells, etc.).

As mentioned, an approach can include generating production versus time data and fitting a decline curve utilizing at least a portion of the generated production versus time data, particularly where actual production data are unavailable for various times. As an example, generated production versus time data may extend over a range from approximately a year or less to more than one year. For example, various examples consider generated production versus time data for a range of approximately four months to approximately thirty-six months, which can be sufficient to adequately fit a decline curve. In such an example, the generated production versus time data can be generated via a plurality of machine learning regression models (e.g., one for each month of production in a desired range).

FIG. 12 shows an example plot 1210 that includes true (unobserved) values of production versus time, ML estimated values of production versus time and fitted curve values of production versus time, and an example of a method 1220.

As shown, the method 1220 includes a reception block 1222 for receiving model inputs that include production values for months one, two and three for a subject well, a generation block 1224 for generating machine learning (ML) regression model estimates for months four to twenty-four (e.g., via daisy chaining models), a fit block 1226 for fitting a curve to the ML regression model estimates, and a comparison block 1228 for predicting production using the fit curve and, for example, for comparing the predicted production of the fit curve to actual production values (e.g., as they become available, etc.).

The plot 1210 shows values associated with the method 1220 where the fit curve provides values (see solid circles) that are less than the ML regression model estimates (see open squares) and less than the actual values (see open circles) for months four to about six and where the fit curve provides values (see solid circles) that are approximately the same as the actual values (see open circles) for months eight to about twenty-four. In the example of FIG. 12, the values of the fit curve, as extending beyond the ML regression model estimates, are somewhat less than the actual production values. The plot 1210 demonstrates how input for three months of production for a subject well (see open circles with larger surrounding circles) can be utilized to predict production for that well to many months into the future, whether via the machine learning regression model estimates and/or fitting one or more curves to the machine learning regression model estimates.

As an example, a method can include combining machine learning regression models and one or more decline curves, for example, to make an EUR prediction for a well or EUR predictions for wells. In such an example, machine learning regression models can be built to predict as far as data are available. For example, if in a field where most wells are 36 months old, a method can include building a machine learning regression model on these data to predict 36 months ahead from, for example, 3 months of production. As an example, to make a prediction 72 months ahead for a 3 month year old well, machine learning regression models (e.g., an ensemble of MLRMs) can be utilized to predict a first 36 months and followed by fitting a decline curve to those 36 months to predict 72 months ahead.

As mentioned, a method can include data cleansing, which may remove certain well production versus time data for purposes of performing machine learning to train a regression model or regression models.

Figure 13:
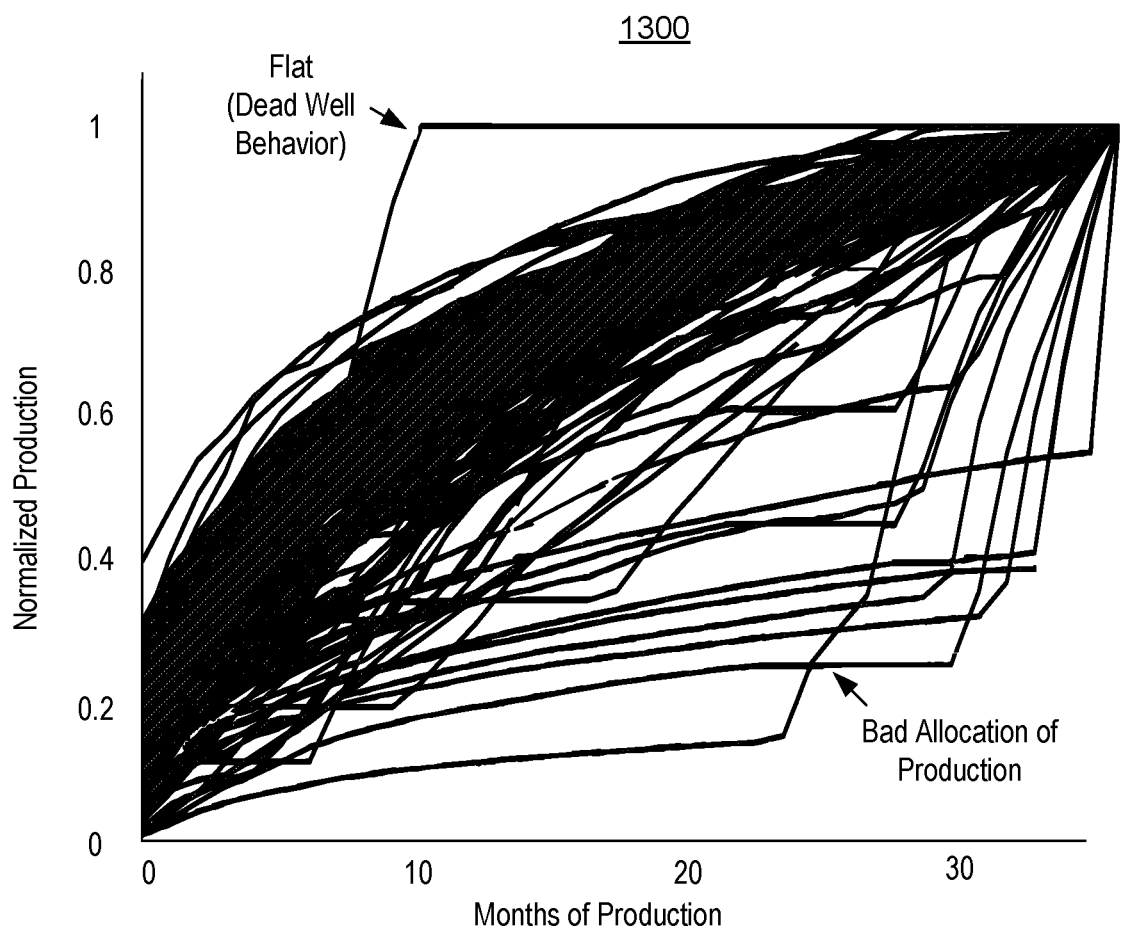
FIG. 13 illustrates an example of a plot.

FIG. 13 shows an example of a plot 1300 of normalized production versus months of production for a plurality of wells. As indicated, some wells can be identified by one or more behavior criteria (e.g., production characteristics) and removed from a data set. As an example, a flat line may indicate dead well behavior and a line that breaks upwardly after some months may indicate a bad allocation of production. As an example, a method may remove well data for certain wells from a data set prior to training one or more machine learning regression models. In the plot 1300, a bulk of the data that remains after cleansing may appear as a contiguous area with a band of normalized production with respect to month of production.

As an example, a method can include cleansing data where such a method includes selecting wells from a group of wells by fitting a log curve to individual cumulative production curves of the group of wells where the fit of the log curve to each well can be utilized to exclude one or more wells, which may be, for example, dead wells or reallocated wells, etc. Such an approach can provide an improved training set for training a machine learning regression model (MLRM).

Table 1, below, shows results of a MLRM approach, labeled ML Model (e.g., machine learning model). For the three different basins examined, the ML Model outperformed its closest competitor (e.g., here referring to the best performing approach of those mentioned in FIGS. 9 and 10).

TABLE 1

Comparative Results

| Basin | ML Model | Closest |
|---|---|---|
| Eagle Ford | 13.9% | 35.9% |
| Permian | 13.8% | 36.5% |
| Williston | 13.1% | 38.3% |

As an example, a method can include receiving data and processing at least a portion of the received data, for example, according to one or more factors. In such an example, consider separation of data by one or more of land leases, fields, or reservoirs.

Figure 14:
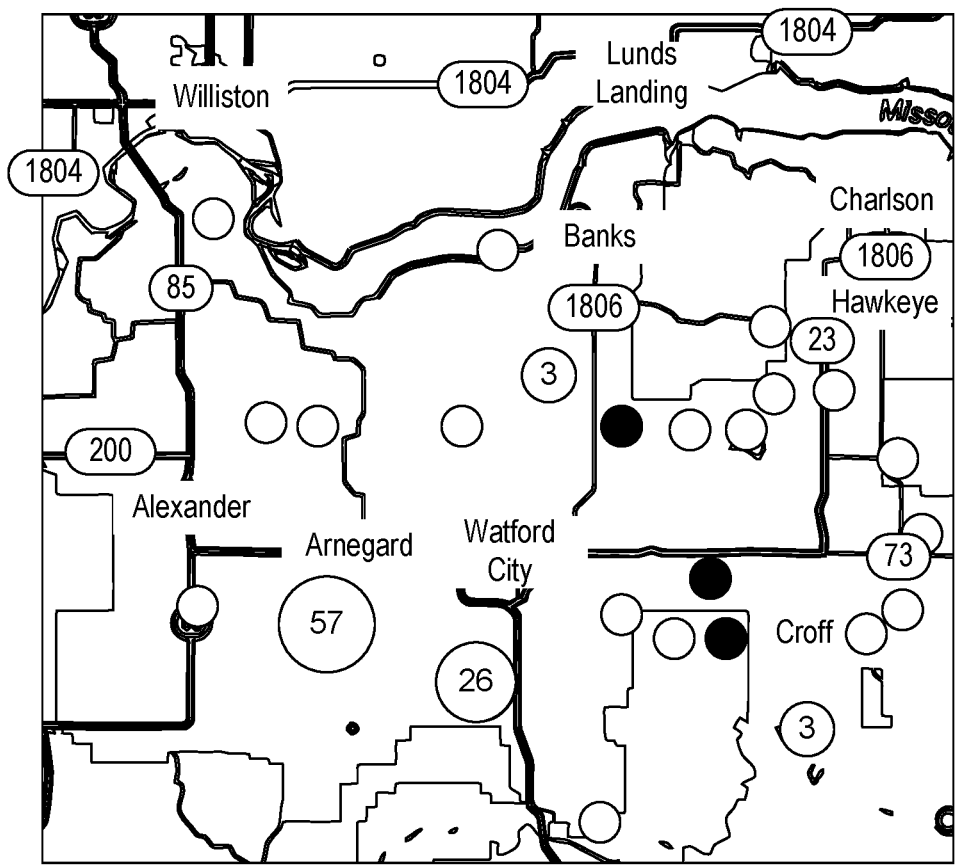
FIG. 14 illustrates an example of a graphical user interface.

FIG. 14 shows an example of a graphical user interface (GUI) 1400 that includes a map view of a region that includes wells where various circles indicate a number of wells in a given portion of the region. As an example, a method can include rendering such a GUI to a display where input may be received via a human input device (HID) that can select one or more wells, which may be subject to prediction (e.g., EUR) and/or acquisition of data as to training of a model, etc.

Figure 15:
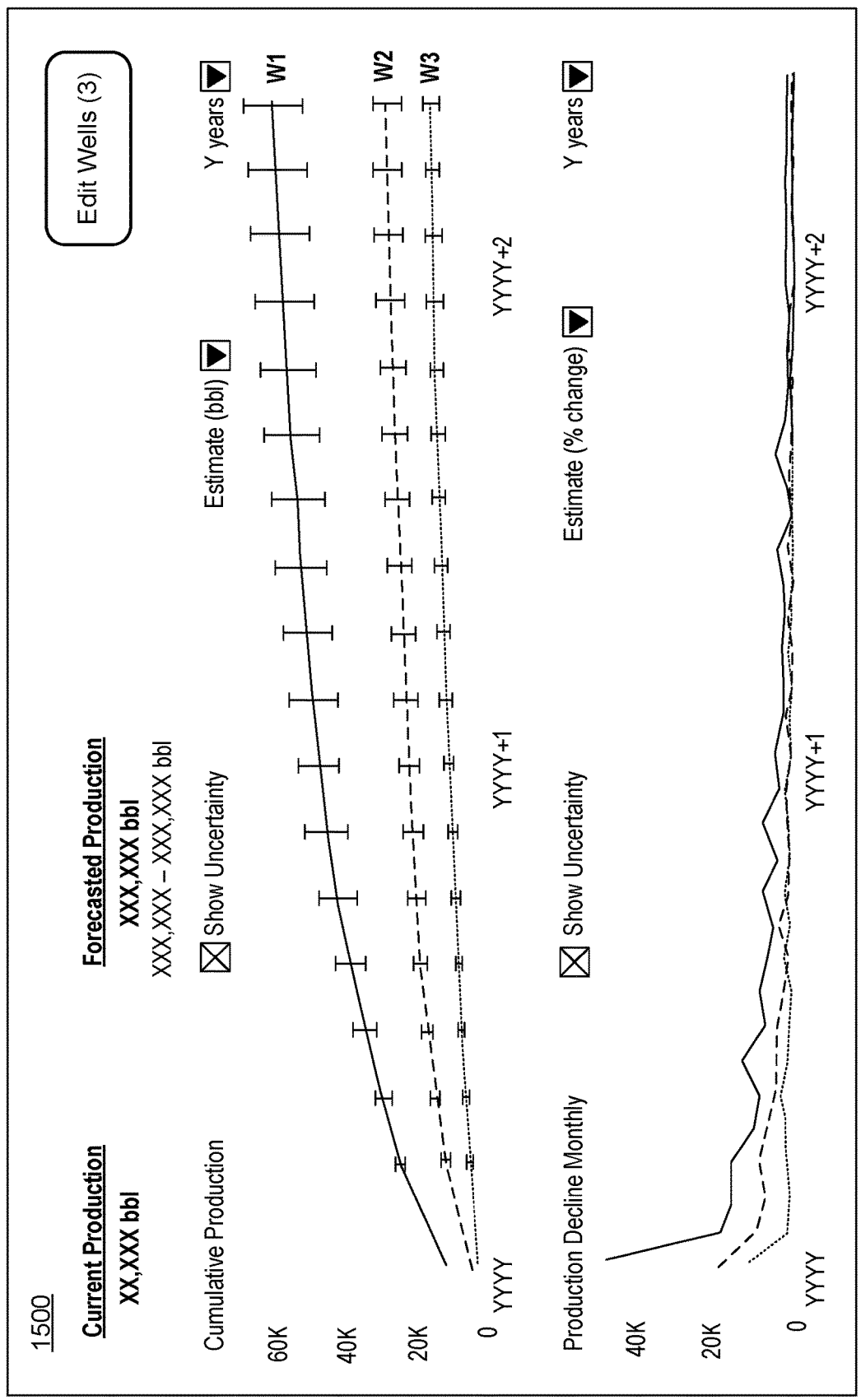
FIG. 15 illustrates an example of a graphical user interface.

FIG. 15 shows an example of a GUI 1500 that includes plots of information for a plurality of wells, which may include one or more wells illustrated in the map view of the GUI 1400 of FIG. 14. For example, the GUI 1400 and the GUI 1500 may be rendered to a display or displays where one or more wells may be selected using the GUI 1400 and where information for at least one of the one or more wells may be rendered using the GUI 1500. In the example of FIG. 15, information for three wells is illustrated in two plots. As shown, the GUI 1500 includes various graphic controls that can be utilized to alter time, estimates, uncertainty rendering, etc. The GUI 1500 can render information such as current production and estimated production where the estimated production may be provided via execution of a method that includes utilization of a tree model (see, e.g., FIGS. 3, 4, 5, 6, 7 and 8).

As an example, a computing device can be operatively coupled to one or more HIDs, which can include, for example, one or more of a mouse, a microphone for voice commands, a touchscreen display, a trackpad, etc. In such an example, a user may interact with a map GUI to select one or more wells where a plot GUI renders information to a display associated with the one or more selected wells. In such an example, upon selection of a well, a method may execute that includes predicting production of a selected well or selected wells. To a user, the predicting may appear instantaneous with little latency. For example, upon selection, prediction may occur within seconds. In such an example, information may be rendered as to one or more selected wells in a manner where a user can rapidly investigate and visually assess the one or more selected wells. As an example, a user may touch a region on a map rendered to a display and within a few seconds, information for a well or wells in that region may be rendered, optionally in a plot view along with numeric values as to individual and/or combined current production and/or forecast production (e.g., predicted production). A map GUI may include a zoom function, which can zoom in or zoom out such that a touch to a touch screen may select a larger or a smaller region (e.g., a geographic region of a field, a basin, etc.).

As explained, a method can allow for rapid prediction of production for one or more wells. Such an approach can allow for rapid assessment via one or more graphical user interfaces (GUIs), for example, as explained with respect to the GUIs 1400 and 1500, which may be linked.

As demonstrated in various plots, prediction accuracy of the tree model approach tends to be twice as good as the other approaches implemented. Such prediction accuracy can stem from the use of various factors, which may include, for example, human and/or economic aspects, which do not occur in physical models (e.g., physics-based models). As an example, a method may be without free parameters, which can be fudge parameters, tuning parameters, etc., in other approaches. As demonstrated, a multi-factor tree model can be more robust and stable as well as, for example, extensible to incorporate one or more new forms of data as it may become available. In contrast, a physics-based model can be inherently limited to particular physics where addition of parameters translates to a more complex physics-based model or models.

As explained, a method may provide a prediction or predictions based on relatively sparse production data. In various examples, training utilized 3 months of production data for predictions for unconventional formations (e.g., unconventional wells); in contrast, the Duong Decline Curves approach, for acceptable results, tends to demand approximately 2 years of production data.

Figure 16:
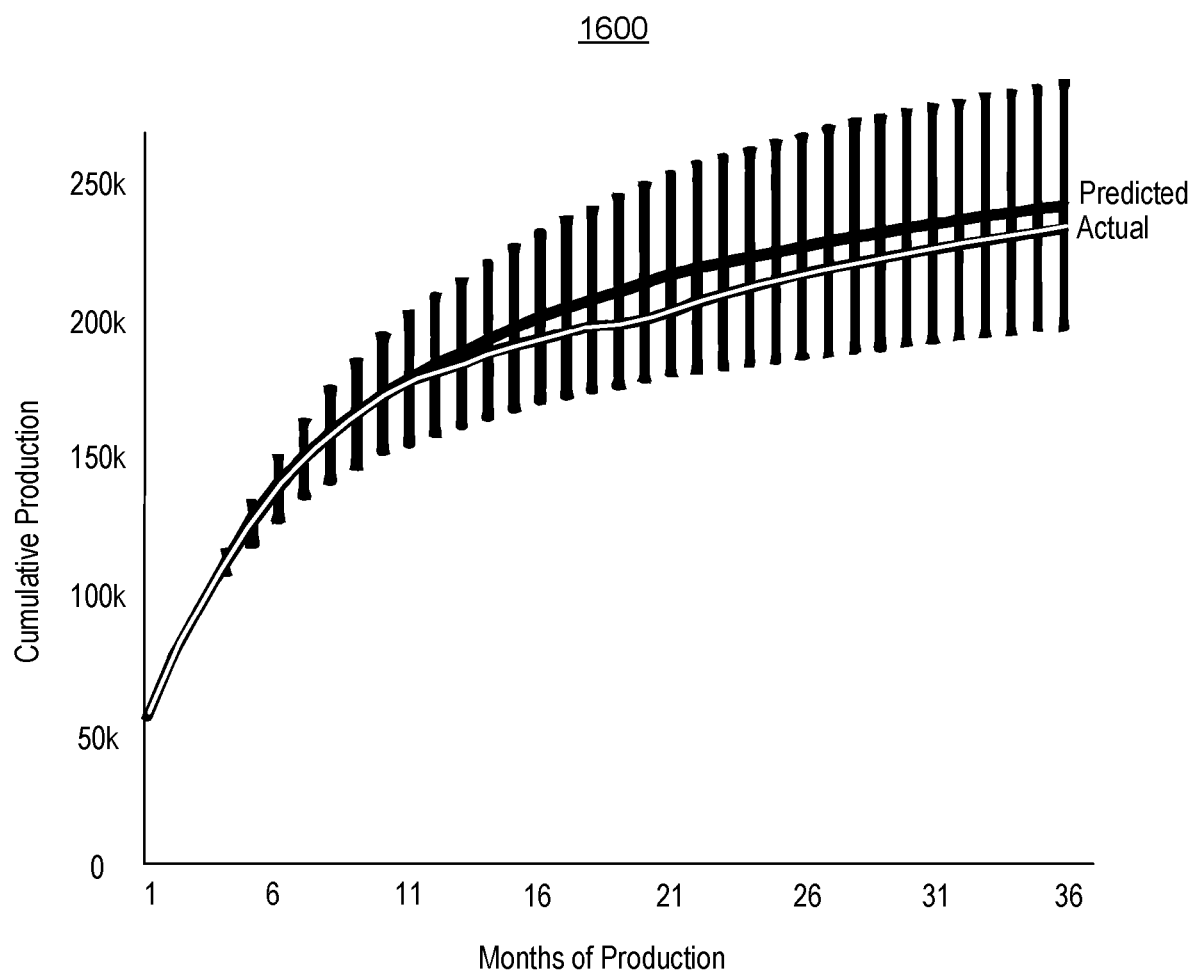
FIG. 16 illustrates an example of a plot.

FIG. 16 shows an example plot 1600 of a forecast cumulative production curve per a regression model approach along with an actual measured cumulative production curve. As shown in the plot 1600, the forecast values (e.g., predicted values based on a regression model approach) align well with the actual values up to about one year (e.g., 12 months) of production. Thereafter, the forecast values tend to be slightly greater than the actual production values. Such differences can be due to factors that may occur during production, which can include human factors, formation factors, equipment factors, physical factors (e.g., injection, artificial lift, adjacent well production, etc.), etc.

As shown in FIG. 16, the cumulative production after about 12 months is around 180,000 barrels while, after 24 months, is around 200,000 barrels to around 220,000 barrels. In other words, of the 24 month cumulative production, most of that occurs in the first 12 months where the forecast and actual cumulative productions are well aligned.

As an example a method may be implemented at least in part using a framework. In such an example, the framework may include various features of the AVOCET® production operations software platform (Schlumberger, Houston, Tex.). The AVOCET® platform includes features for workflow automation, online artificial lift management, predictive data analysis for candidate selection, web-based performance indicators visualization for review of operations, etc.

The AVOCET® platform can connect to engineering simulation models and analytical applications, for example, to provide insight into root causes of production shortfalls, to improve production operations management, etc. The AVOCET® platform may provide features that allow for consideration of a broad range of asset disciplines. The AVOCET® platform may integrate well operations and production management systems, for example, including capture and validation of field data, production, and equipment surveillance and tracking specialized oilfield operations. The AVOCET® platform includes functionality for unification of various data, which may be data from disparate data sources, as well as bridging such data with one or more engineering models in user environment that allows users to identify problems more quickly, minimizing downtime and enabling continuous production optimization.

As an example, a production operations platform may benefit field staff, production and reservoir engineers, production accountants, administrators, etc. One or more graphical user interfaces may be contextualized to view asset performance, monitor performance indicators (PIs), visualize relevant information that can affect production, impact performance, etc. As an example, performance metrics may be visualized, including allocated production against plan for a full portfolio of assets. As an example, a programming framework (e.g., the MICROSOFT® SILVERLIGHT® framework marketed by Microsoft Corp., Redmond, Wash.) may support access to a production operations platform, for example, via a network (e.g., the Internet) for data entry, validation, contextualization, viewing of information (e.g., in the field, office, mobile device, etc., where underlying platforms, operating systems, etc., may differ).

As an example, a method can include receiving data where the data include data for a plurality of factors associated with a plurality of wells; training a regression model based at least in part on the data and the plurality of factors; outputting a trained regression model; and predicting production of a well via the trained regression model. In such an example, the predicting can include receiving production data for the well and inputting at least a portion of the production data to the trained regression model. As an example, such production data can be production data for less than approximately four months of production of the well as measured from initiation of production of the well and, for example, the predicting production can include predicting production to at least twelve months of production of the well where at least six of the at least twelve months are future months.

As an example, a method can include predicting production for an unconventional well. As an example, an unconventional well can be characterized by values for a plurality of factors, which may include, for example, a lateral length factor as to a lateral length of a portion of the well that can be disposed at least in part in a reservoir.

As an example, a method can include predicting production for a well that is in fluid communication with at least one hydraulic fracture. As an example, a factor for such a well may be a proppant related factor. As an example, a factor for such a well may be a number of stages related factor (e.g., a number of hydraulic fracturing stages).

As an example, a regression model may be a multiple factor tree model. Such a model can utilize multiple factors, which may provide for decision making in progression from a trunk to a branch and, for example, to a leaf.

As an example, a method can include training a plurality of regression models, outputting the plurality of trained regression models; and predicting production of a well via the plurality of trained regression models. In such an example, the method can include fitting a decline curve to the predicted production of the well and, for example, predicting production of the well based on the fit decline curve. As an example, a method that utilizes a plurality of regression models may utilize a plurality of multiple factor tree models.

As an example, a regression model can include at least one depth factor. As an example, a regression model can include at least one water factor. As an example, a regression model can include at least one length factor. As an example, a regression model can include a depth factor and a length factor. In such an example, a depth factor may be a total vertical depth (TVD) factor and a length factor may be a lateral length (LL) factor. As an example, a regression model can include an azimuth factor, a location factor, a TVD factor and a LL factor. As an example, a regression model can include a location factor (e.g., longitude and latitude of a well at a well head, etc.), a TVD factor (e.g., with respect to a well head, with respect to a surface location, etc.) and a LL factor (e.g., from a well head, from a heel to a toe, for a perforated portion in reservoir rock, etc.). As an example, a regression model can include an initial production rate factor, an azimuth factor, a location factor, a total fluid factor, a proppant factor, a TVD factor and a LL factor.

As an example, a method can include cleansing data prior to training a regression model. In such an example, the cleansing can include fitting a log curve to well production versus time data and including the well production versus time data or excluding the well production versus time data based at least in part on the fitting.

As an example, a system can include a processor; memory operatively coupled to the processor; and instructions stored in the memory and executable by the processor to instruct the system to: receive data where the data include data for a plurality of factors associated with a plurality of wells; train a regression model based at least in part on the data and the plurality of factors; output a trained regression model; and predict production of a well via the trained regression model. In such an example, the instructions can include instructions to instruct the system to train a plurality of regression models, output the plurality of trained regression models; predict production of a well via the plurality of trained regression models; fit a decline curve to the predicted production of the well; and predict production of the well based on the fit decline curve.

As an example, one or more computer-readable storage media can include computer-executable instructions to instruct a computing system to: receive data where the data include data for a plurality of factors associated with a plurality of wells; train a regression model based at least in part on the data and the plurality of factors; output a trained regression model; and predict production of a well via the trained regression model. In such an example, the computer-executable instructions can include computer-executable instructions to instruct the computing system to train a plurality of regression models, output the plurality of trained regression models; predict production of a well via the plurality of trained regression models; fit a decline curve to the predicted production of the well; and predict production of the well based on the fit decline curve.

As described, various embodiments may provide one or more systems, methods, and/or computer-readable media for predicting production of hydrocarbon wells.

Figure 17:
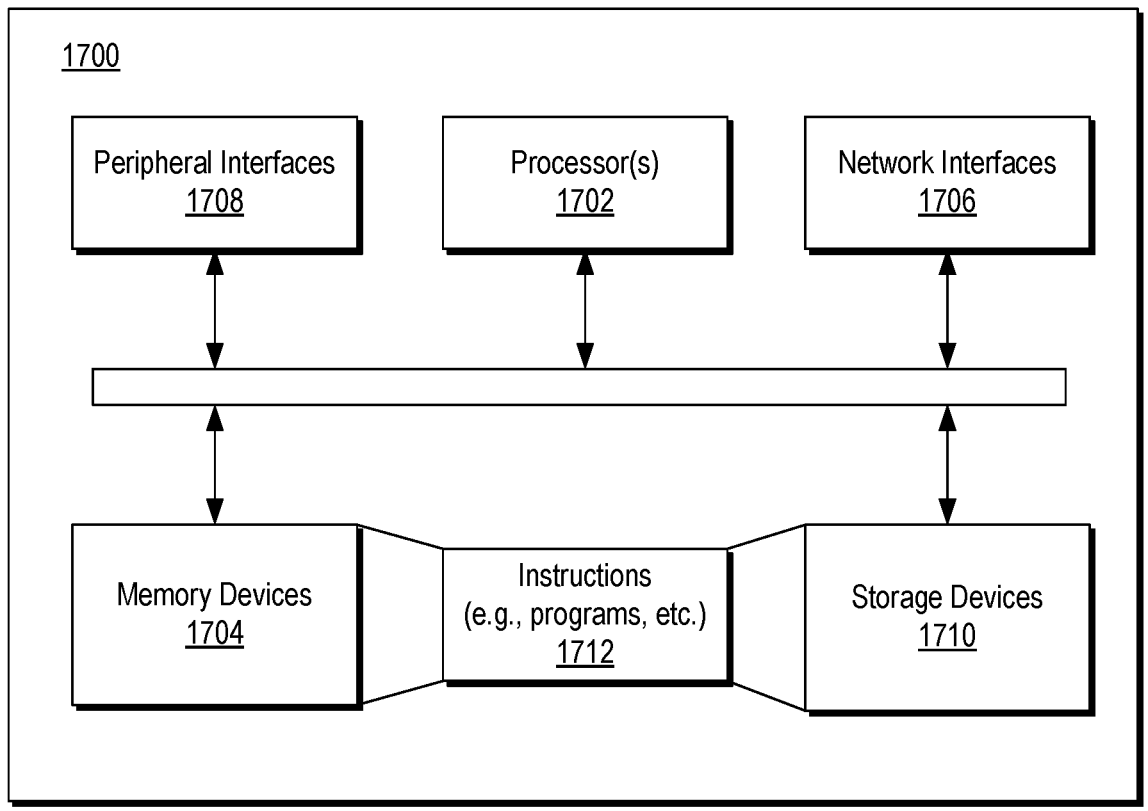
FIG. 17 illustrates example components of a system.

FIG. 17 shows an example of a schematic view of a computing or processor system 1700, which may be implemented to make one or more predictions (e.g., EUR, etc.).

As shown in FIG. 17, the processor system 1700 may include one or more processors 1702 optionally of one or more varying core configurations (including multiple cores) and clock frequencies. The one or more processors 1702 may be operable to execute instructions, apply logic, etc. Such functions may be, for example, provided by multiple processors or multiple cores on a single chip operating in parallel and/or communicably linked together. In at least one embodiment, the one or more processors 1702 may be or include one or more GPUs.

The processor system 1700 may also include a memory system, which may be or include one or more memory devices and/or computer-readable media 1704 of varying physical dimensions, accessibility, storage capacities, etc. such as flash drives, hard drives, disks, random access memory, etc., for storing data, such as images, files, and program instructions for execution by the processor 1702. In an embodiment, the computer-readable media 1704 may store instructions that, when executed by the processor 1702, are configured to cause the processor system 1700 to perform operations. For example, execution of such instructions may cause the processor system 1700 to implement one or more portions and/or embodiments of the method(s) described above.

As shown in the example of FIG. 17, the various features of the processor system 1700 may be operatively coupled. For example, at least one of the one or more processors 1702 may be operatively coupled to one or more of the memory devices 1704. In such an example, instructions 1712 stored in one or more of the memory devices 1704 can be accessible to the at least one of the one or more processors 1702.

The processor system 1700 may also include one or more network interfaces 1706. The network interfaces 1706 may include any hardware, applications, and/or other software. Accordingly, the network interfaces 1706 may include Ethernet adapters, wireless transceivers, PCI interfaces, and/or serial network components, for communicating over wired or wireless media using protocols, such as Ethernet, wireless Ethernet, etc.

As an example, the processor system 1700 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 1700 may further include one or more peripheral interfaces 1708, for communication with a display, projector, keyboards, mice, touchpads, sensors, other types of input and/or output peripherals, and/or the like. In some implementations, the components of processor system 1700 may be enclosed within a single enclosure or not. For example, one or more components may be distant from one or more other components (e.g., distributed, remote, networked, etc.). As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

In the example of FIG. 17, the one or more memory devices 1704 may be physically or logically arranged or configured to store data on one or more storage devices 1710. The one or more storage devices 1710 may include one or more file systems or databases in a suitable format or formats. The one or more storage devices 1710 may also include one or more sets of instructions (e.g., software programs) 1712, which may contain interpretable or executable instructions for performing one or more actions. When requested by one of the one or more processors 1702, one or more of the sets of instructions (e.g., software programs) 1712, or a portion thereof, may be loaded from at least one of the one or more storage devices 1710 to at least one of the one or more memory devices 1704 for execution by at least the one of the one or more processors 1702.

The processor system 1700 is an example of a hardware configuration, as the processor system 1700 may include one or more types of hardware components, including accompanying firmware and/or software. The processor system 1700 may be, for example, implemented in part or in whole by electronic circuit components or processors, such as application-specific integrated circuits (ASICs) or field-programmable gate arrays (FPGAs).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving data wherein the data comprise data for a plurality of factors associated with a plurality of wells;
   training a regression model based at least in part on the data and the plurality of factors, wherein the regression model comprises a lateral length factor and a sine and cosine of mean azimuth of trajectory factor;
   outputting a trained regression model; and
   predicting production of a well via the trained regression model.

2. The method of claim 1 wherein the predicting comprises receiving production data for the well and inputting at least a portion of the production data to the trained regression model.

3. The method of claim 2 wherein the production data comprises production data for less than four months of production of the well as measured from initiation of production of the well.

4. The method of claim 3 wherein the predicting production comprises predicting production to at least twelve months of production of the well wherein at least six of the at least twelve months comprise future months.

5. The method of claim 1 wherein the well comprises an unconventional well.

6. The method of claim 1 wherein the well is in fluid communication with at least one hydraulic fracture.

7. The method of claim 1 wherein the regression model comprises a multiple factor tree model.

8. The method of claim 1 comprising training a plurality of regression models, outputting the plurality of trained regression models; and predicting production of a well via the plurality of trained regression models.

9. The method of claim 8 comprising fitting a decline curve to the predicted production of the well and predicting production of the well based on the fit decline curve.

10. The method of claim 8 wherein the plurality of regression models comprise multiple factor tree models.

11. The method of claim 1 wherein the regression model comprises at least one depth factor.

12. The method of claim 1 wherein the regression model comprises at least one water factor.

13. The method of claim 1 wherein the regression model comprises a depth factor.

14. The method of claim 1 comprising cleansing the data prior to the training.

15. The method of claim 14 wherein the cleansing comprises fitting a log curve to well production versus time data and including the well production versus time data or excluding the well production versus time data based at least in part on the fitting.

16. A system comprising:
a processor;
memory operatively coupled to the processor; and
instructions stored in the memory and executable by the processor to instruct the system to:
receive data wherein the data comprise data for a plurality of factors associated with a plurality of wells;
train a regression model based at least in part on the data and the plurality of factors, wherein the regression model comprises a lateral length factor and a sine and cosine of mean azimuth of trajectory factor;
output a trained regression model; and
predict production of a well via the trained regression model.

17. The system of claim 16 wherein the instructions comprise instructions to instruct the system to:
train a plurality of regression models;
output the plurality of trained regression models;
predict production of a well via the plurality of trained regression models;
fit a decline curve to the predicted production of the well; and
predict production of the well based on the fit decline curve.

18. One or more nontransitory computer-readable storage media comprising computer-executable instructions to instruct a computing system to:
receive data wherein the data comprise data for a plurality of factors associated with a plurality of wells;
train a regression model based at least in part on the data and the plurality of factors, wherein the regression model comprises a lateral length factor and a sine and cosine of mean azimuth of trajectory factor;
output a trained regression model; and
predict production of a well via the trained regression model.

19. The one or more nontransitory computer-readable storage media of claim 18 wherein the computer-executable instructions comprise computer-executable instructions to instruct the computing system to:
train a plurality of regression models;
output the plurality of trained regression models;
predict production of a well via the plurality of trained regression models;
fit a decline curve to the predicted production of the well; and
predict production of the well based on the fit decline curve.

* * * * *